(12) United States Patent  
Yokoyama

(10) Patent No.: US 8,649,815 B2
(45) Date of Patent: Feb. 11, 2014

(54) BASE STATION DEVICE, COMMUNICATION SYSTEM, AND METHOD FOR CONTROLLING COMMUNICATION SYSTEM

(75) Inventor: Hitoshi Yokoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 359 days.

(21) Appl. No.: 13/036,301

(22) Filed: Feb. 28, 2011

(65) Prior Publication Data

US 2011/0230225 A1    Sep. 22, 2011

(30) Foreign Application Priority Data

Mar. 16, 2010    (JP) .................................. 2010-59523

(51) Int. Cl.
*H04W 52/04*    (2009.01)

(52) U.S. Cl.
USPC ........................................... 455/522; 455/69

(58) Field of Classification Search
USPC ....................................................... 455/522
See application file for complete search history.

(56) References Cited

U.S. PATENT DOCUMENTS

| | | | | |
|---|---|---|---|---|
| 4,985,899 A * | 1/1991 | Walsh | ............................. | 375/136 |
| 5,778,030 A * | 7/1998 | Bruckert et al. | ............... | 375/317 |
| 5,946,356 A * | 8/1999 | Felix et al. | ..................... | 375/295 |
| 6,956,840 B1 * | 10/2005 | Proctor, Jr. | ..................... | 370/342 |
| 7,099,673 B2 * | 8/2006 | Yamashita | ................... | 455/452.2 |
| 7,184,417 B2 * | 2/2007 | Proctor, Jr. | ..................... | 370/329 |
| 7,260,398 B2 * | 8/2007 | Igarashi et al. | ................ | 455/436 |
| 7,292,824 B2 * | 11/2007 | Yamaguchi et al. | .......... | 455/63.1 |
| 7,301,989 B2 * | 11/2007 | Tamaki et al. | ................. | 375/146 |
| 7,359,424 B2 | 4/2008 | Hosomi | | |
| 7,573,850 B2 * | 8/2009 | Li et al. | ......................... | 370/329 |
| 7,577,227 B2 * | 8/2009 | Budka et al. | ................... | 375/377 |
| 7,599,695 B2 * | 10/2009 | Igarashi et al. | ............... | 455/438 |
| 7,668,564 B2 * | 2/2010 | Onggosanusi et al. | ........ | 455/522 |
| 7,873,362 B2 * | 1/2011 | Nyberg et al. | ................. | 455/446 |
| 7,899,073 B2 * | 3/2011 | Laroia et al. | ................... | 370/436 |
| 7,953,167 B2 * | 5/2011 | Ode et al. | ....................... | 375/260 |

(Continued)

FOREIGN PATENT DOCUMENTS

| | | |
|---|---|---|
| JP | 2002-16526 | 1/2002 |
| JP | 2005-341297 | 12/2005 |

(Continued)

OTHER PUBLICATIONS

Notification of Reason for Refusal dated May 7, 2013, from corresponding Japanese Application No. 2010-059523.

*Primary Examiner* — Hai V Nguyen

(74) *Attorney, Agent, or Firm* — Katten Muchin Rosenman LLP

(57) ABSTRACT

A communication system includes a base station device that includes a setting unit where, when the bandwidth of a signal to be transmitted from the base station device to the wireless terminal is set from a first bandwidth to a second bandwidth, which is narrower than the first bandwidth, the transmission power per unit bandwidth of the signal to be transmitted from the base station device to the wireless terminal is set from a first transmission power to a second transmission power, which is larger than the first transmission power, and when the bandwidth is set from the second bandwidth to the first bandwidth, the transmission power is set from the second transmission power to the first transmission power, and the wireless terminal includes a reception unit that receives a notification of the set bandwidth and uses the set bandwidth to receive a signal.

12 Claims, 33 Drawing Sheets

(56) References Cited

U.S. PATENT DOCUMENTS

| | | | |
|---|---|---|---|
| 8,055,202 B2* | 11/2011 | Nagato et al. | 455/67.11 |
| 8,072,918 B2* | 12/2011 | Muharemovic et al. | 370/319 |
| 8,144,725 B2* | 3/2012 | Bienas et al. | 370/449 |
| 8,145,226 B2* | 3/2012 | Kojima | 455/450 |
| 8,249,634 B2* | 8/2012 | Ishii et al. | 455/509 |
| 8,270,355 B2* | 9/2012 | Noma | 370/329 |
| 8,275,408 B2* | 9/2012 | Attar et al. | 455/522 |
| 8,284,703 B2* | 10/2012 | Puri et al. | 370/310 |
| 8,315,217 B2* | 11/2012 | Montojo et al. | 370/329 |
| 8,321,126 B2* | 11/2012 | Mays | 701/428 |
| 8,325,701 B2* | 12/2012 | Yamauchi et al. | 370/343 |
| 8,363,610 B2* | 1/2013 | Ode et al. | 370/329 |
| 8,369,884 B2* | 2/2013 | Ishii et al. | 455/522 |
| 8,378,608 B2* | 2/2013 | Robertson | 318/438 |
| 8,385,921 B1* | 2/2013 | Shousterman et al. | 455/442 |
| 8,401,128 B2* | 3/2013 | Lindoff et al. | 375/345 |
| 8,406,173 B2* | 3/2013 | Akimoto et al. | 370/328 |
| 8,437,788 B2* | 5/2013 | Li et al. | 455/509 |
| 2001/0010686 A1* | 8/2001 | Kubo et al. | 370/335 |
| 2002/0001336 A1 | 1/2002 | Hosomi | |
| 2002/0187799 A1* | 12/2002 | Haartsen | 455/509 |
| 2003/0064729 A1* | 4/2003 | Yamashita | 455/451 |
| 2004/0203967 A1* | 10/2004 | Yamaguchi et al. | 455/509 |
| 2005/0025081 A1* | 2/2005 | Wakamatsu | 370/311 |
| 2006/0039346 A1* | 2/2006 | Shapiro | 370/349 |
| 2006/0105797 A1* | 5/2006 | Marsan et al. | 455/522 |
| 2007/0171862 A1* | 7/2007 | Tang et al. | 370/329 |
| 2007/0243829 A1* | 10/2007 | Nagato et al. | 455/67.11 |
| 2007/0291720 A1* | 12/2007 | Lee | 370/338 |
| 2008/0294062 A1* | 11/2008 | Rapoport et al. | 600/544 |
| 2008/0318527 A1 | 12/2008 | Higuchi et al. | |
| 2009/0247180 A1* | 10/2009 | Higuchi et al. | 455/452.2 |
| 2009/0296641 A1* | 12/2009 | Bienas et al. | 370/329 |
| 2010/0034108 A1* | 2/2010 | Ode | 370/252 |
| 2010/0048151 A1* | 2/2010 | Hara | 455/115.1 |
| 2010/0056197 A1* | 3/2010 | Attar et al. | 455/522 |
| 2010/0080135 A1* | 4/2010 | Ishii et al. | 370/252 |
| 2010/0113080 A1* | 5/2010 | Ishii et al. | 455/509 |
| 2010/0118836 A1* | 5/2010 | Kazmi et al. | 370/336 |
| 2010/0118844 A1* | 5/2010 | Jiao et al. | 370/338 |
| 2010/0167752 A1* | 7/2010 | Kojima | 455/452.2 |
| 2010/0246482 A1* | 9/2010 | Erceg et al. | 370/328 |
| 2011/0053601 A1* | 3/2011 | Frederiksen et al. | 455/447 |
| 2012/0155417 A1* | 6/2012 | Kojima | 370/329 |
| 2012/0224555 A1* | 9/2012 | Lee et al. | 370/329 |
| 2012/0327896 A1* | 12/2012 | Lee et al. | 370/330 |

FOREIGN PATENT DOCUMENTS

| | | |
|---|---|---|
| JP | 2007-151056 | 6/2007 |
| JP | 2009-124461 | 6/2009 |
| JP | 2009-130740 | 6/2009 |
| WO | 2007/052811 | 5/2007 |
| WO | 2008/084623 | 7/2008 |

* cited by examiner

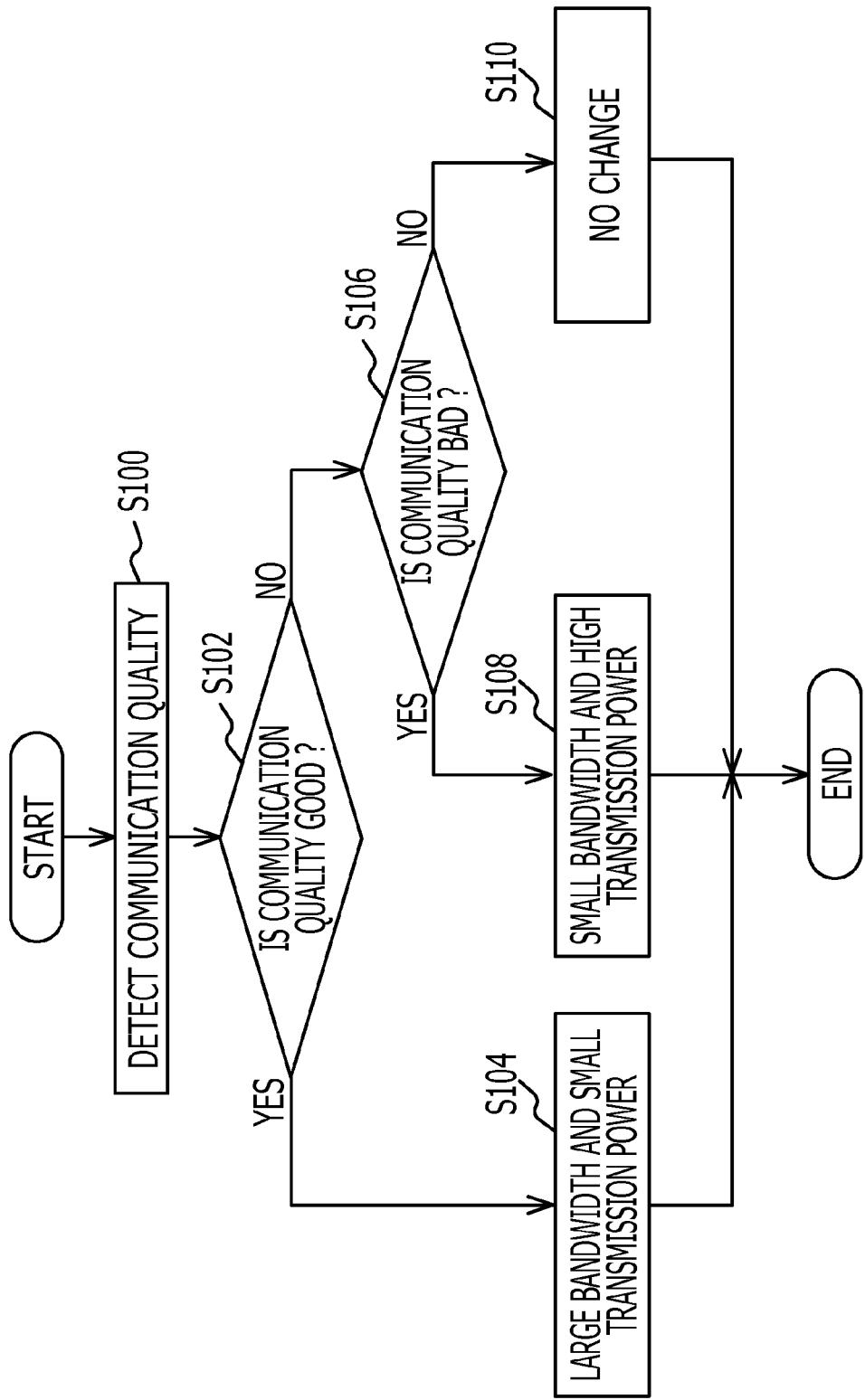

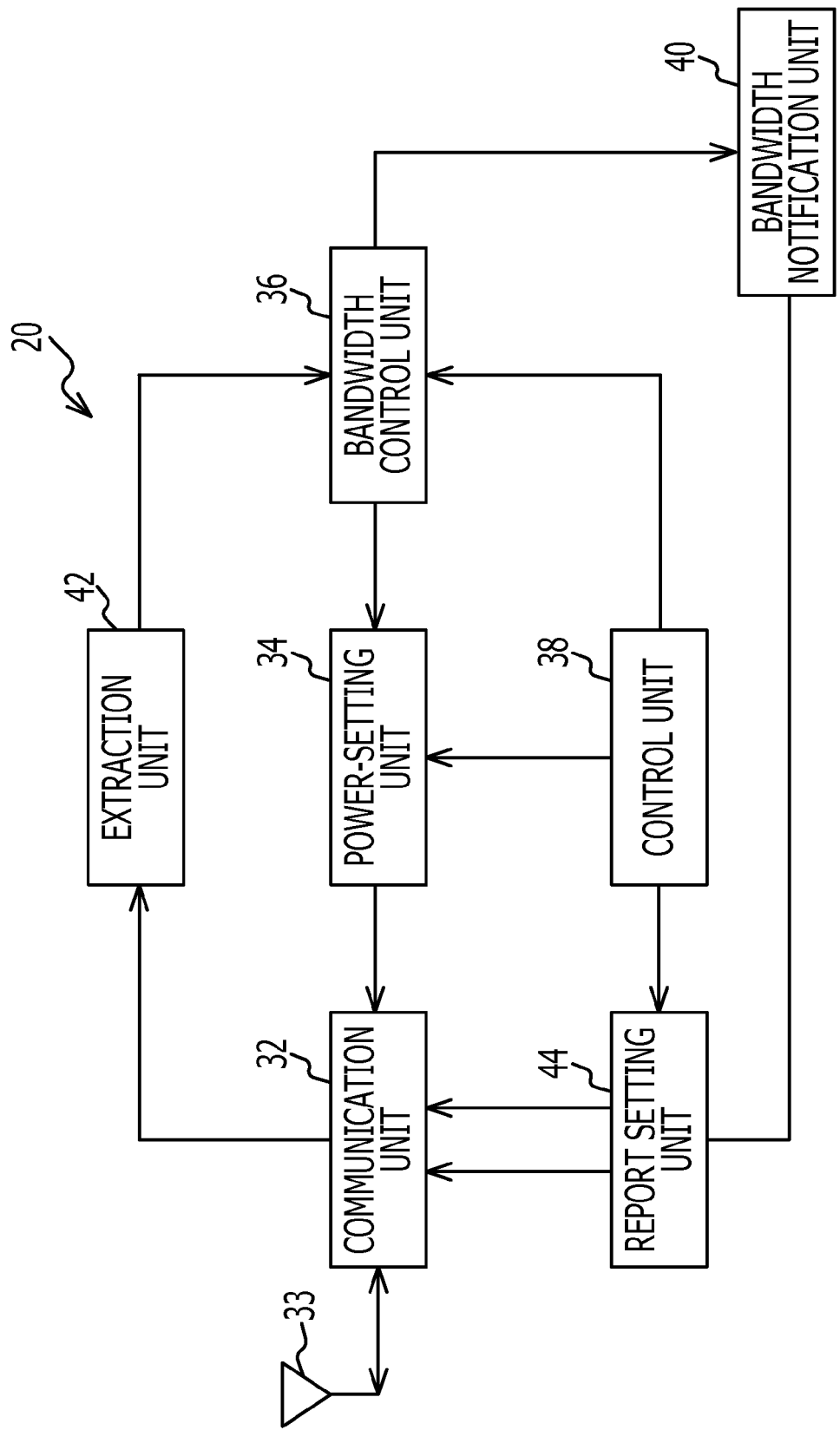

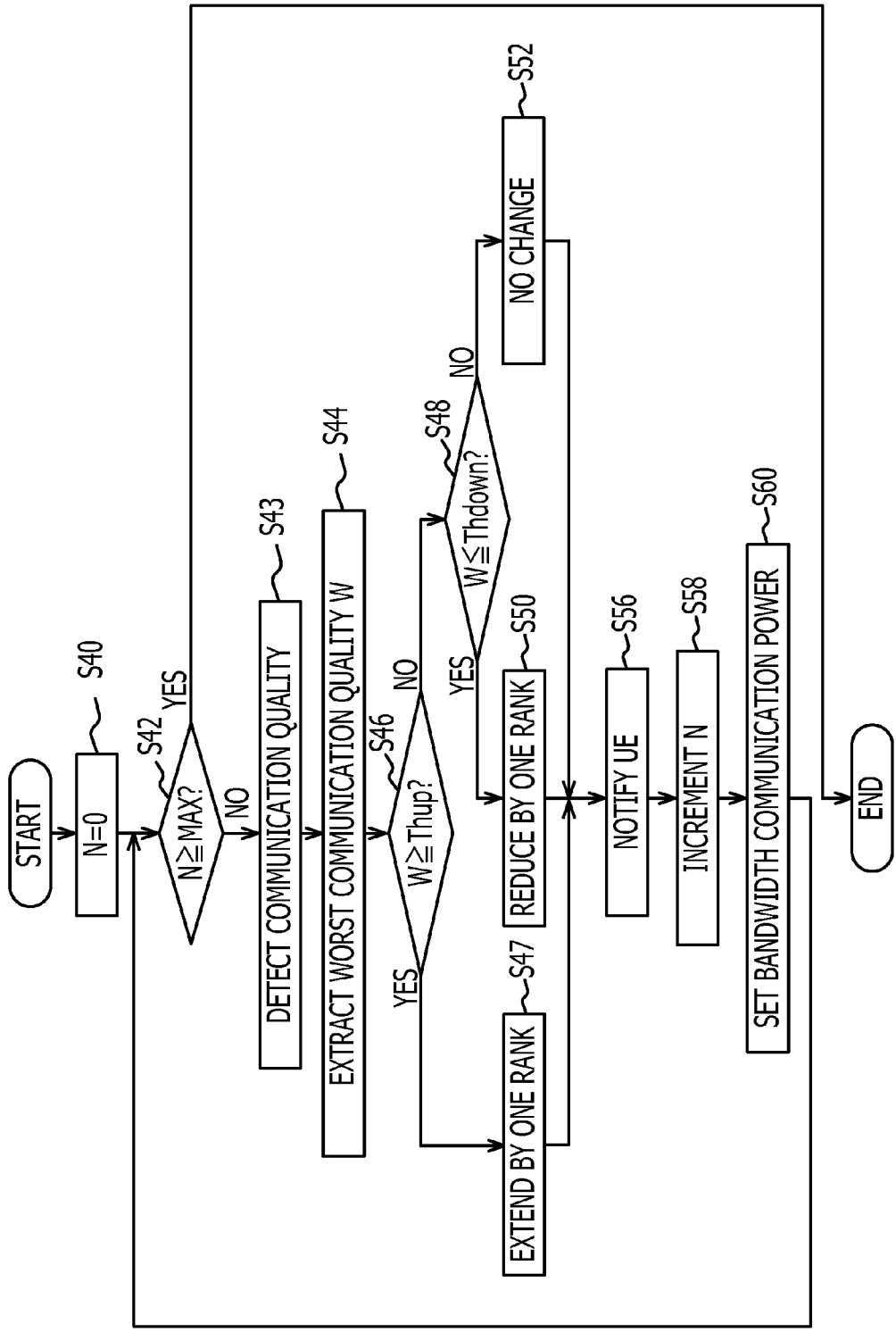

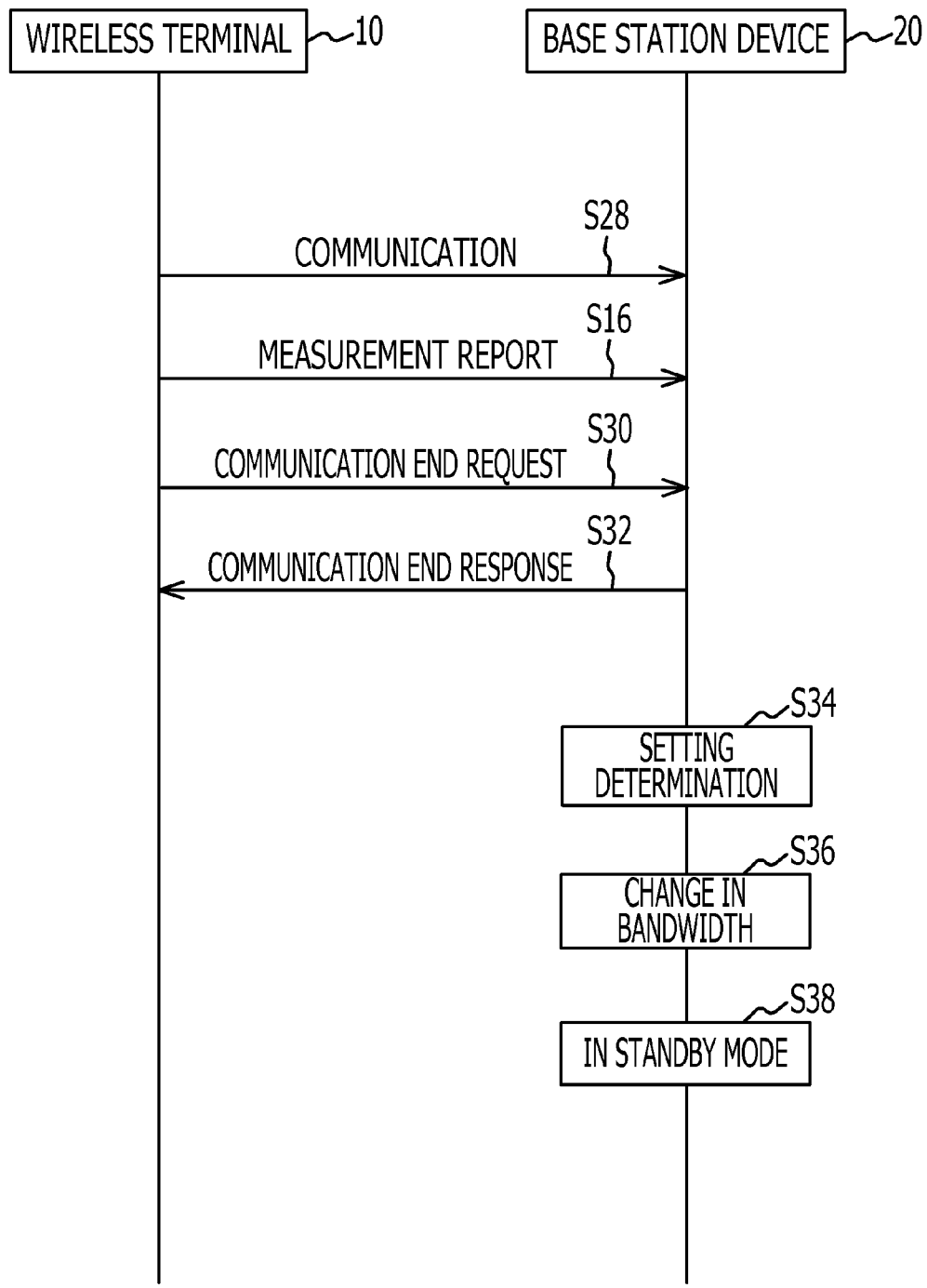

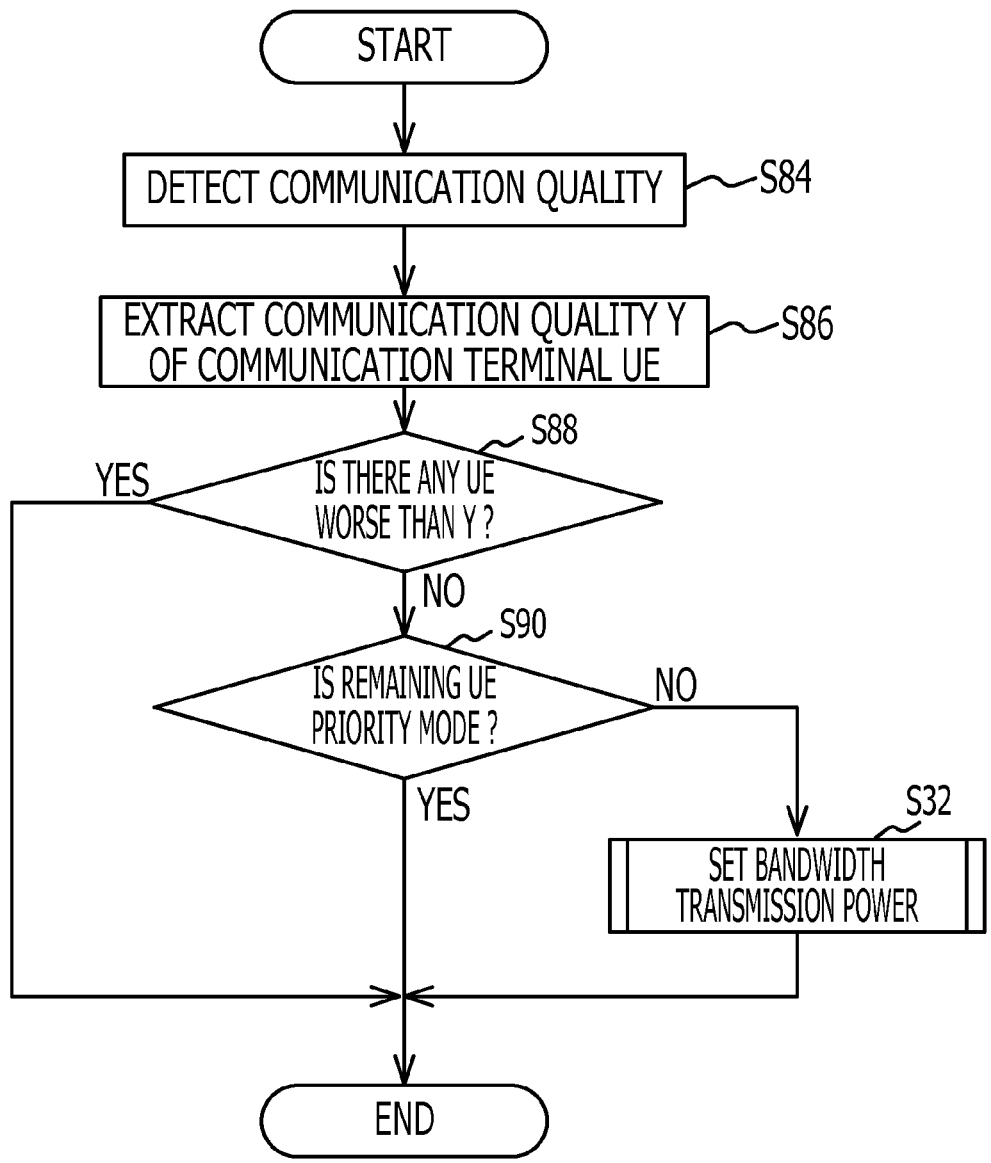

BASE STATION DEVICE, COMMUNICATION SYSTEM, AND METHOD FOR CONTROLLING COMMUNICATION SYSTEM

CROSS-REFERENCE TO RELATED APPLICATIONS

This application is based upon and claims the benefit of priority of the prior Japanese Patent Application No. 2010-59523, filed on Mar. 16, 2010, the entire contents of which are incorporated herein by reference.

FIELD

The present invention relates to a base station device, a communication system, and a method for controlling a communication system.

BACKGROUND

In a wireless communication system, a wireless terminal performs wireless communication with a base station within the communication zone of the base station. The base station sets a bandwidth and a transmission power for wireless communication with the wireless terminal.

For example, Japanese Unexamined Patent Application Publication No. 2007-151056 discloses bandwidth and transmission power to be transmitted from a wireless terminal to base station. In addition, Japanese Unexamined Patent Application Publication No. 2009-130740 discloses a femto base station which is capable of changing the diameter of a cell.

SUMMARY

According to an aspect of the embodiment, a communication system includes a base station device that includes a setting unit where, when the bandwidth of a signal to be transmitted from the base station device to the wireless terminal is set from a first bandwidth to a second bandwidth, which is narrower than the first bandwidth, the transmission power per unit bandwidth of the signal transmitted from the base station device to the wireless terminal is set from a first transmission power to a second transmission power, which is larger than the first transmission power, and when the bandwidth is set from the second bandwidth to the first bandwidth, the transmission power is set from the second transmission power to the first transmission power, and said wireless terminal includes a reception unit that receives a notification of the set bandwidth and uses the bandwidth to receive a signal.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 6 is a flowchart illustrating a process performed by the base station device of the first embodiment;

FIG. 7 is a block diagram illustrating a base station device of a second embodiment;

FIG. 16 is a flow chart illustrating a process performed by the base station device in step S32 in FIG. 15;

FIG. 17 is a sequence diagram illustrating the case where the wireless terminal in communication sends a communication end request to a base station device in the second embodiment;

FIG. 33 is a flow chart illustrating a process of the base station device in step S34 in FIG. 32.

DESCRIPTION OF EMBODIMENTS

Figure 1:
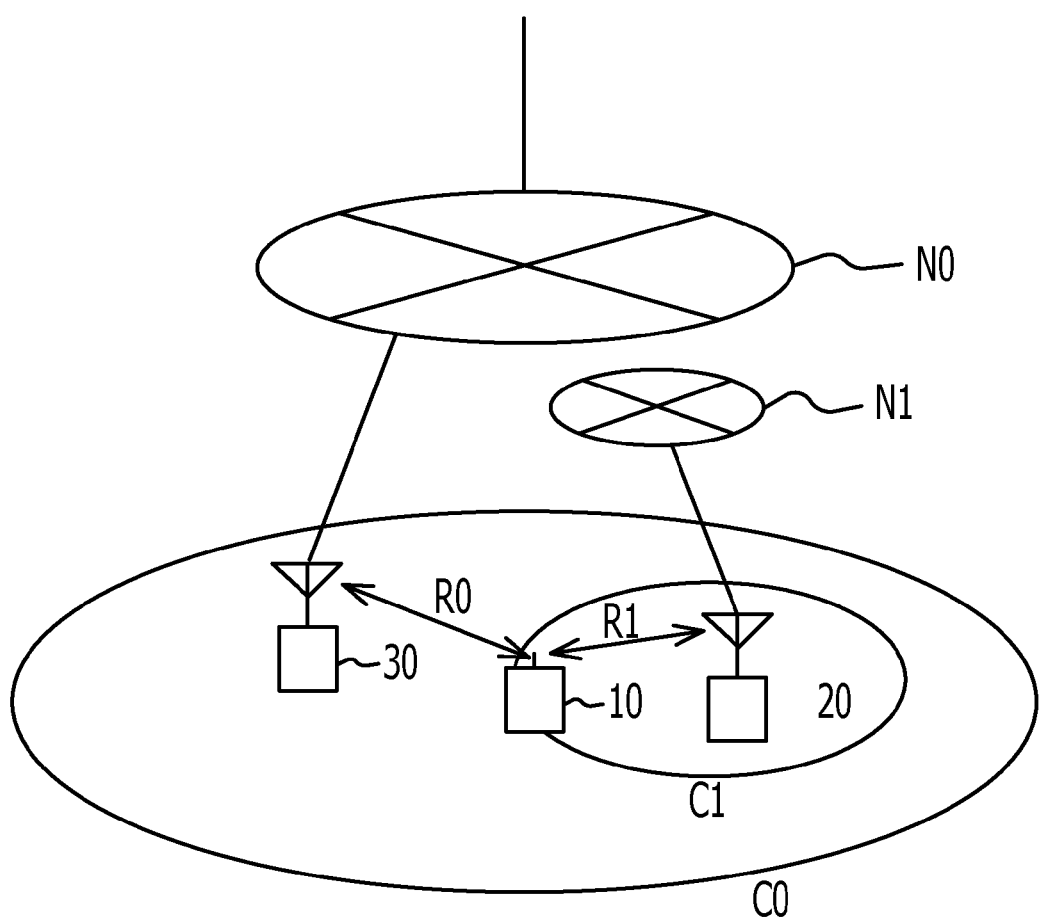
FIG. 1 is a block diagram illustrating a system including a communication system according to a first embodiment.

Some base station devices have their respective upper limits of transmission power under laws and regulations or the like. The restricted upper limit of transmission power of the base station device requires an appropriately determined bandwidth of signal to be transmitted from the base station device to a wireless terminal and an appropriately determined transmission power per unit bandwidth.

Therefore, a base station device, a communication system, and a method for controlling the communication system of the present embodiments intend to set up an appropriate bandwidth and an appropriate transmission power per unit bandwidth.

Means for Solving the Problem

For example, a communication system is used. The communication system includes a wireless terminal and a base station device that wirelessly communicates with the wireless terminal. The base station terminal includes a setting unit. When the bandwidth of a signal to be transmitted from the base station device to the wireless terminal is set from a first bandwidth to a second bandwidth, which is narrower than the first bandwidth, the setting unit sets the transmission power per unit bandwidth of the signal transmitted from the base station device to the wireless terminal from a first transmission power to a second transmission power, which is larger than the first transmission power. When the first bandwidth is set from the second bandwidth to the first bandwidth, setting unit sets the transmission power from the second transmission power to the first transmission power. The wireless terminal includes a reception unit that receives a notification of the set bandwidth and then uses the bandwidth to receive a signal transmitted by the set transmission power per unit band.

For example, a base station device that wirelessly communicates with a wireless terminal is used. The base station device includes a setting unit. When the bandwidth of a signal to be transmitted from the base station device to the wireless terminal is set from a first bandwidth to a second bandwidth, which is narrower than the first bandwidth, the setting unit sets the transmission power per unit bandwidth of the signal transmitted from the base station device to the wireless terminal from a first transmission power to a second transmission power, which is larger than the first transmission power. When the first bandwidth is set from the second bandwidth to the first bandwidth, the setting unit sets the transmission power from the second transmission power to the first transmission power. The base station device also includes a transmission unit that notifies the set bandwidth to the wireless terminal and uses the set bandwidth to transmit a signal by the set transmission power per unit bandwidth.

For example, a method for controlling a communication system is used. The method for controlling a communication system that includes a wireless terminal and a base station device, which wirelessly communicates with the wireless terminal, comprises the steps of: setting the transmission electric power per unit bandwidth of the signal transmitted from the base station device to the wireless terminal from a first transmission power to a second transmission power, which is larger than the first transmission power, when the bandwidth of a signal to be transmitted from the base station device to the wireless terminal is set from a first bandwidth to a second bandwidth, which is narrower than the first bandwidth, and setting the transmission power from the second transmission power to the first transmission power when the bandwidth is set from the second bandwidth to the first bandwidth; and allowing the wireless terminal to receive a notification of the set bandwidth and use the bandwidth to receive a signal transmitted by the set transmission power per unit bandwidth.

According to the base station device, the communication system, and the method for controlling the communication system, can set an appropriate bandwidth and an appropriate transmission power per unit bandwidth.

Hereinafter, the embodiments will be described with reference to the attached drawings.

A femto cell system will be described as an example of the first embodiment. The femto cell system is a system that sets up a femto base station having an area that partially overlaps with the wireless communication area of a macroscopic base station and narrower than that of a macroscopic base station. The use of the femto base station can cancel an electric wave insensible area which can be caused when only a macro base is established. Therefore, a small femto base station is installed in a subscriber's house or building. The femto system is defined by, for example, the 3rd Generation Partnership Project (3GPP) TS 22.220 ver. 911.

FIG. 1 is a block diagram illustrating a system including the communication system according to the first embodiment. As shown in FIG. 1, a base station device 20 is arranged in a cell C0 of a base station device 30. For example, the base station device 30 may be a macro base station device and the base station device 20 may be a femto base station. A wireless terminal 10 (UE: User Equipment) can make communication R0 with the base station device 30 in the cell C0. In addition, the wireless terminal 10 can make communication R1 with the base station device 20 in the cell C1 of the base station device 20. For example, in a small-scale base station device 20 like a femto base station, it is assumed that the number of wireless terminals 10 present in a zone (in the cell C1) is small. The base station device 20 is connected to a network N0 via a network N1. The base station device 30 is connected to a network N0. Furthermore, for example, the network N0 may be connected to a wireless terminal or the like via another network or the like. Alternatively, the network N0 may be connected to an application server. Furthermore, for example, the network N1 may be an internet work and the network N0 may be a carrier network of the communication system.

Figure 2A:
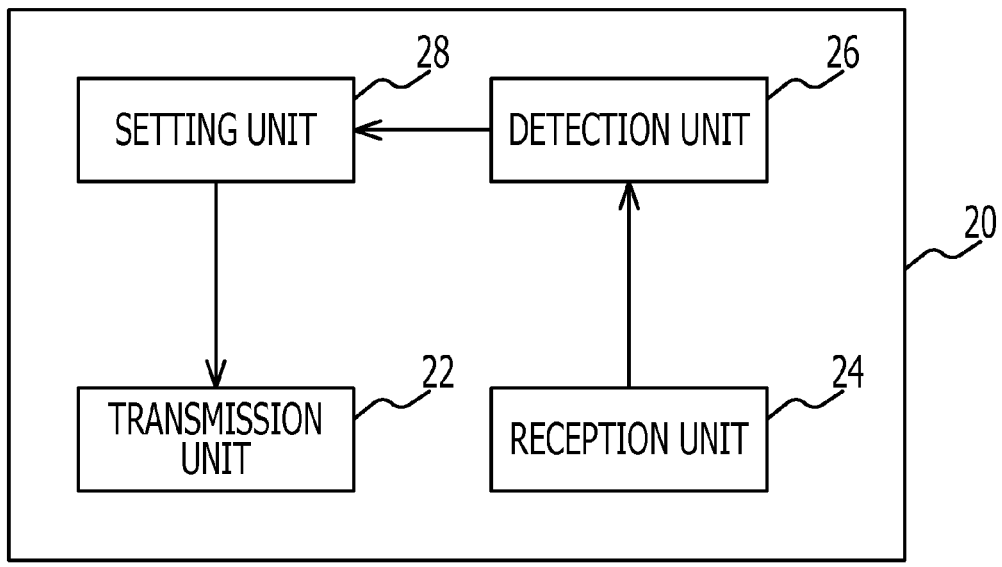
FIG. 2A and FIG. 2B are block diagrams illustrating a base station device and a wireless terminal of the first embodiment.
Figure 2B:
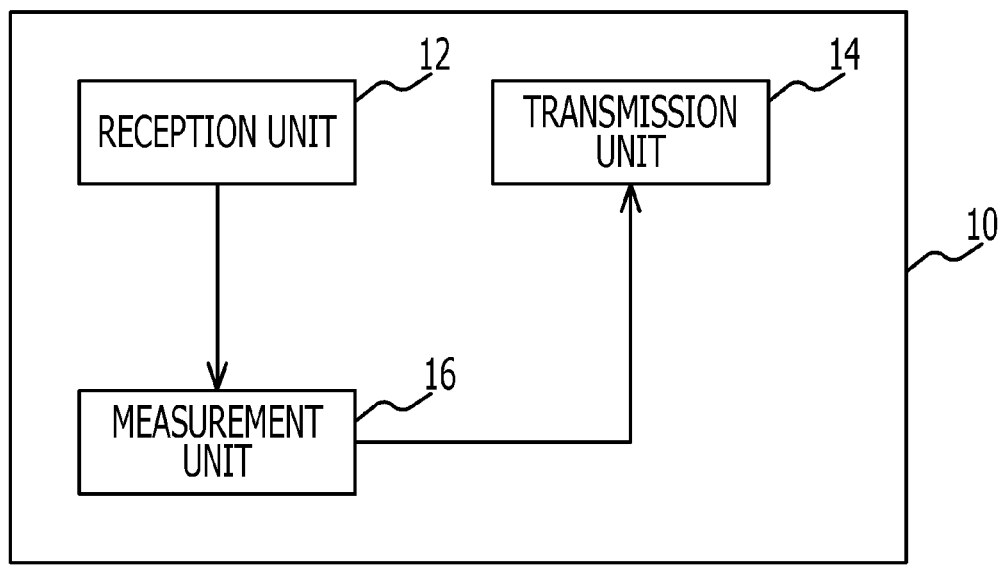

FIG. 2A and FIG. 2B are block diagrams illustrating a base station device and a wireless terminal of the first embodiment, respectively. As shown in FIG. 2A, the base station device 20 includes a transmission unit 22, a reception unit 24, a detection unit 26, and a setting unit 28. The transmission unit 22 transmits a signal to the wireless terminal 10. The reception unit 24 receives a signal from the wireless terminal 10. The detection unit 26 detects the quality of communication between the base station device 20 and the wireless communication terminal 10 in communication with the base station device 20. The setting unit 28 determines the bandwidth of a signal to be transmitted to the wireless terminal 10 and transmission power per unit bandwidth. The transmission unit 22, the reception unit 24, and the detection unit 26 are analog circuits and realized by application-specific integrated circuit (ASIC) or the like. In addition, the setting unit 28 can be realized by a field programmable gate array (FPGA) or digital signal processing (DSP) in a digital circuit.

As shown in FIG. 2B, the wireless terminal 10 includes a reception unit 12, a transmission unit 14, and a measurement unit 16. The reception unit 12 receives a signal from the base station device 20. The transmission unit 14 transmits a signal to the base station device 20. The measurement unit 16 evaluates the quality of communication based on the signal received from the base station device 20. For example, the measurement unit 16 measures the received power of a pilot signal transmitted from the base station device 20. The measurement unit 16 transmits information about the evaluated communication quality to the base station device 20. For example, when the wireless terminal 10 is far from the base station device 20, a large loss of radio waves in a propagation path from the base station device 20 to the wireless terminal 10 occurs. As a result, a degradation in communication quality occurs. On the other hand, for example, if the wireless terminal 10 nears the base station device 20, radio loss in the propagation path becomes low. Thus, the quality of communication can be improved.

For example, in the femto base station, the maximum transmission power may be defined under laws and regulations to prevent another electronic apparatus from being subjected to the undesired effects of the maximum transmission power. The maximum transmission power is several 10 mW, for example. In Example 1, therefore, the setting unit 28 can define an appropriate bandwidth and an appropriate transmission power per unit bandwidth without a change in maximum transmission power.

Figure 3A:
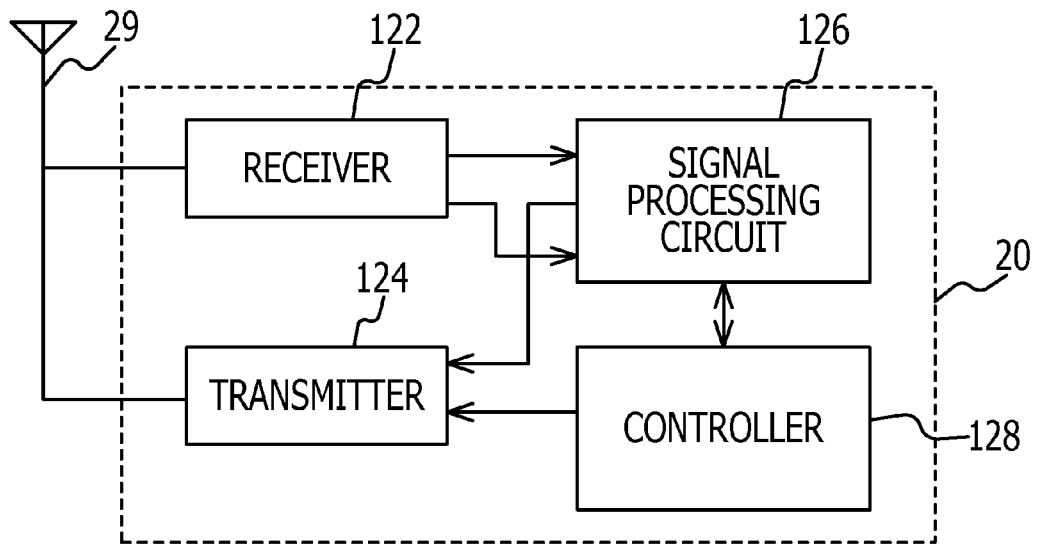
FIG. 3A, and FIG. 3B are block diagrams illustrating a base station device and a wireless terminal of the first embodiment.
Figure 3B:
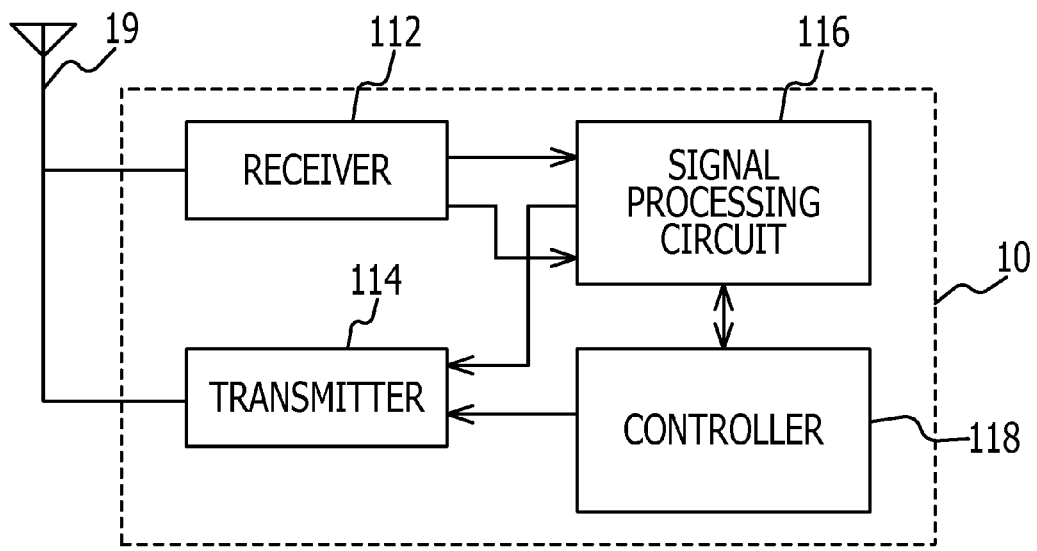

FIG. 3A and FIG. 3B are block diagrams that represent the base station device and the wireless terminal of the first embodiment, respectively. As shown in FIG. 3A, the base station device 20 includes a receiver 122, a transmitter 124, a signal processing circuit 126, and a controller 128. The receiver 122 acts as a reception unit 24 that receives a signal from the wireless terminal 10. The transmitter 124 acts as a transmission unit 22 that transmits a signal to the wireless terminal 10. The signal processing circuit 126 processes a signal received by the receiver 122 and a signal transmitted from the transmitter 124. The controller 128 controls the signal-processing circuit 126 and the transmitter 124. The signal-processing circuit 126 and the controller 128 function as the detection unit 26 and the setting unit 28, respectively.

As shown in FIG. 3B, the wireless terminal 10 includes a receiver 112, a transmitter 114, a signal processing circuit 116, and a controller 118. The receiver 112 acts as a reception unit 12 that receives a signal from the base station device 20. The transmitter 114 acts as a transmission unit 14 that transmits a signal to the base station device 20. The signal-processing circuit 116 processes a signal received by the receiver 112 and a signal transmitted from the transmitter 114. The controller 118 controls the signal processing circuit 116 and the transmitter 114. The signal processing circuit 116 and the controller 118 function as a measurement unit 16.

Figure 4A:
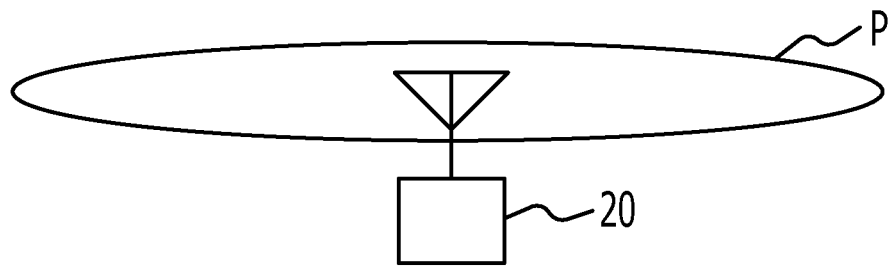
FIG. 4A, FIG. 4B, and FIG. 4C are schematic diagrams illustrating the bandwidth and the transmission power per unit bandwidth.
Figure 4B:
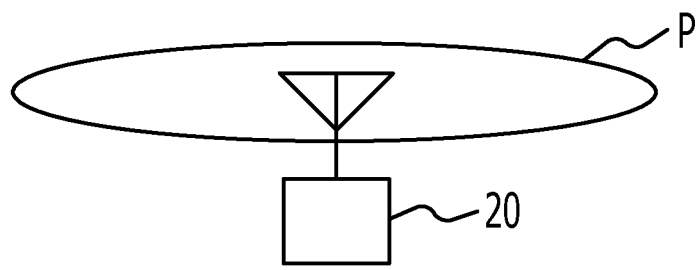
Figure 4C:
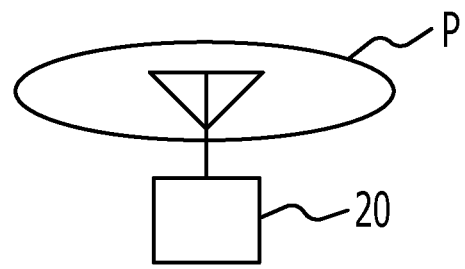
Figure 5A:
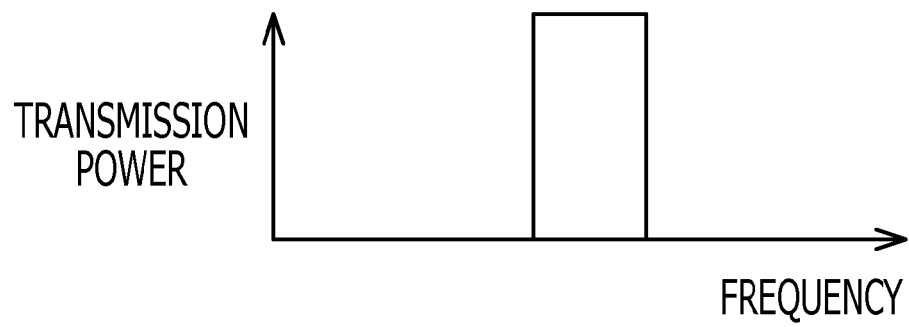
FIG. 5A, FIG. 5B, and FIG. 5C are graphs illustrating the bandwidth and the transmission power per unit bandwidth.
Figure 5B:
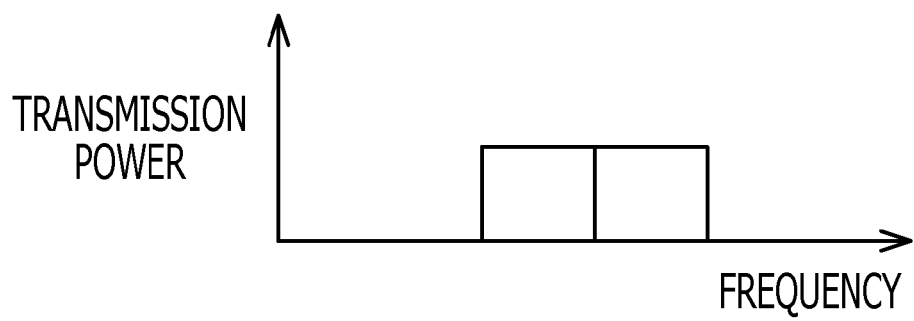
Figure 5C:
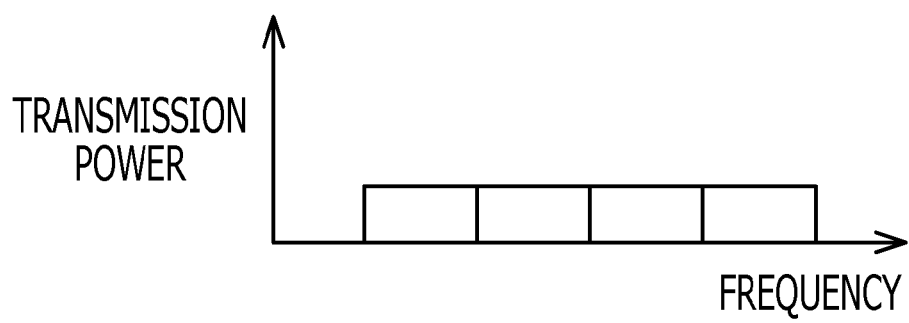

FIG. 4A to FIG. 4C and FIG. 5A to FIG. 5C are schematic diagrams and graphs illustrating the bandwidth and the transmission power per unit bandwidth, which are defined by the base station device. Here, for example, the bandwidth is of a signal transmitted from the base station device 20 to the wireless terminal 10. For example, the transmission power per unit bandwidth is one transmitted from the base station device 20 to the wireless terminal 10. In the mode where the base station device 20 increases the transmission power P per unit bandwidth as shown in FIG. 4A, the base station device 20 narrows the bandwidth of a signal transmitted to the wireless terminal 10 as shown in FIG. 5A. In the mode where the base station device 20 reduces the transmission power P per unit bandwidth as shown in FIG. 4B, the base station device 20 expands the bandwidth of a signal transmitted to the wireless terminal 10 as shown in FIG. 5B. In the mode where the base station device 20 further reduces the transmission power P per unit bandwidth as shown in FIG. 4C, the base station device 20 further expands the bandwidth of a signal transmitted to the wireless terminal 10 as shown in FIG. 5C.

As shown in FIG. 4A and FIG. 5A, if the transmission power per unit bandwidth is large, the quality of the communication between the wireless terminal 10 and the base station device 20 can be improved. However, since the bandwidth is narrow, the transmission rate of a signal becomes low. On the other hand, as shown in FIG. 4C and FIG. 5C, the transmission rate of a signal to the wireless terminal 10 can be increased if the bandwidth is wide. However, the quality of communication can be degraded due to a low transmission power per unit bandwidth. In the first embodiment, the setting unit 28 defines an appropriate bandwidth and an appropriate transmission power. Namely, examples of the transmission width may include 20 MHz, 15 MHz, 10 MHz, and 5 MHz. In addition, for example, the transmission power per unit bandwidth at a bandwidth of 20 MHz may be equal to one fourth of the transmission power per unit bandwidth at a bandwidth of 5 MHz. Likewise, for example, the transmission power per unit bandwidth at a bandwidth of 20 MHz may be equal to one half of the transmission power per unit bandwidth at a bandwidth of 10 MHz.

FIG. 6 is a flowchart illustrating a process performed by the base station device of the first embodiment. For example, the setting unit 28 defines both a bandwidth and a transmission power per unit bandwidth as shown in FIG. 5B. Referring now to FIG. 6, the detection unit 26 of the base station device 20 detects information about communication quality measured by the wireless terminal 10 (step S100). The setting unit 28 determines whether the communication quality is favorable (step S102). For example, if the communication quality is more favorable than a first reference quality, the setting unit 28 concludes "Yes", but "No" when unfavorable. If it is "Yes", then the setting unit 28 extends the bandwidth and reduces the transmission power per unit bandwidth (step S104). For example, the setting unit 28 determines both a bandwidth and a transmission power per unit bandwidth as shown in FIG. 5C. If it is "No" in step S102, then the setting unit 28 determines whether the communication quality is worse (step S106). For example, if the communication quality is worse than a second reference quality, then the setting unit 28 concludes "Yes". Here, the second reference quality is defined as a value lower than that of the first reference value. If it is "Yes" in step S106, then the setting unit 28 reduces the bandwidth and enlarges the transmission power per unit bandwidth (step S108). For example, the setting unit 28 may define both the bandwidth and the transmission power per unit bandwidth as shown in FIG. 5A. In step S106, if it is "No", then the setting unit 28 keeps both the bandwidth and the transmission power per unit bandwidth as they are (step S110). For example, the setting unit 28 keeps both the bandwidth and the transmission power per unit bandwidth as those found in the state shown in FIG. 5B.

Likewise, the base station device 30 shown in FIG. 1 can transmit a signal with a previously-defined bandwidth and a transmission power based on the communication quality.

According to the first embodiment, as shown in from step S102 to step S110 in FIG. 6, the setting unit 28 determines a bandwidth and a transmission power per unit bandwidth based on the result of determining the quality of communication by the detection unit 26. At this time, if the bandwidth is set to be narrower, then the transmission power per unit bandwidth is set to be higher. In contrast, if the bandwidth is set to be wider, then the transmission power per unit bandwidth is set to be lower. In other words, if the setting unit 28 sets the bandwidth from the first bandwidth to the second bandwidth, which is narrower than the first bandwidth, then the transmission power per unit bandwidth is set from the first transmission power to the second transmission power, which is larger than the first transmission power. On the other hand, if the setting unit 28 sets the bandwidth from the second bandwidth to the first bandwidth, then the transmission power unit bandwidth is set from the second transmission power to the first transmission power. Therefore, under the limited transmission power of the base station device 20, both the transmission width and the transmission power per unit bandwidth can be defined appropriately. For example, if the communication quality is worse, then the bandwidth is set to be narrow and the transmission power per unit bandwidth is set to be high. In other words, the setting unit 28 sets the second bandwidth and the second transmission power. Therefore, even though the transmission rate of a signal becomes worse, the quality of communication can be improved. On the other hand, if the communication quality is good, then the transmission power per unit bandwidth is made low. In other words, the setting unit 28 sets the first bandwidth and the first transmission power. The transmission unit 22 of the base station device 20 notifies the wireless terminal 10 of the set bandwidth and transmits a signal with a transmission power per unit bandwidth, which is set using the bandwidth. On the other hand, the reception unit 12 of the wireless terminal 10 receives the notice of the set bandwidth and also uses such a bandwidth of a receive signal transmitted with the set transmission power per unit bandwidth. Therefore, the transmission rate can be improved within a range that satisfies the communication quality.

In particular, it is preferable that the setting part 28 sets both the bandwidth and the transmission power per unit bandwidth so that the production of the bandwidth and the transmission power per unit bandwidth is brought into constant. Therefore, both the bandwidth and the transmission power per unit bandwidth can be appropriately set using the predetermined maximum transmission power which is the production of the bandwidth and the transmission power per unit bandwidth.

A second embodiment will be described as a concrete example of the first embodiment. FIG. 7 is a block diagram illustrating a base station device of the second embodiment. As shown in FIG. 7, a communication unit 32 performs transmission/reception of a signal to the wireless terminal 10 through an antenna 33. In the communication unit 32, the transmitted signal is encoded, modulated, subjected to analog-conversion, and up-converted to a high frequency signal. In the communication unit 32, furthermore, the received group is down-converted into a baseband signal, digitalized, demodulated, and decoded. For example, the transmission unit 22 and the reception unit 24 of the first embodiment may correspond to the communication unit 32. A power setting unit 34 sets a transmission power per unit bandwidth to be transmitted by the communication unit 32. An extraction unit 42 extracts information about a report for propagation path quality from the received signal. The detection unit 26 of the first embodiment corresponds to the extraction unit 42 and the quality of communication corresponds to, for example, the quality of propagation path.

The bandwidth control unit 36 sets a bandwidth and a transmission power per unit bandwidth to be transmitted to the wireless terminal 10 based on the report of propagation path quality extracted by the extraction unit 42. The setting unit 28 of the first embodiment corresponds to, for example, the bandwidth control unit 36. The bandwidth notification unit 40 notifies the wireless terminal 10 of a change in bandwidth in response to an instruction from the bandwidth control unit 36. The control unit 38 manages the processing for communication connection and the state of communication connection. For example, the control unit 38 notifies the bandwidth control unit 36 of the number and state of wireless terminals 10 in communication. A report-setting unit 44 sets information for allowing the wireless terminal 10 to report the quality of propagation. In addition, the report-setting unit 44 sets the bandwidth to be notified by the bandwidth notification unit 40.

Figure 8:
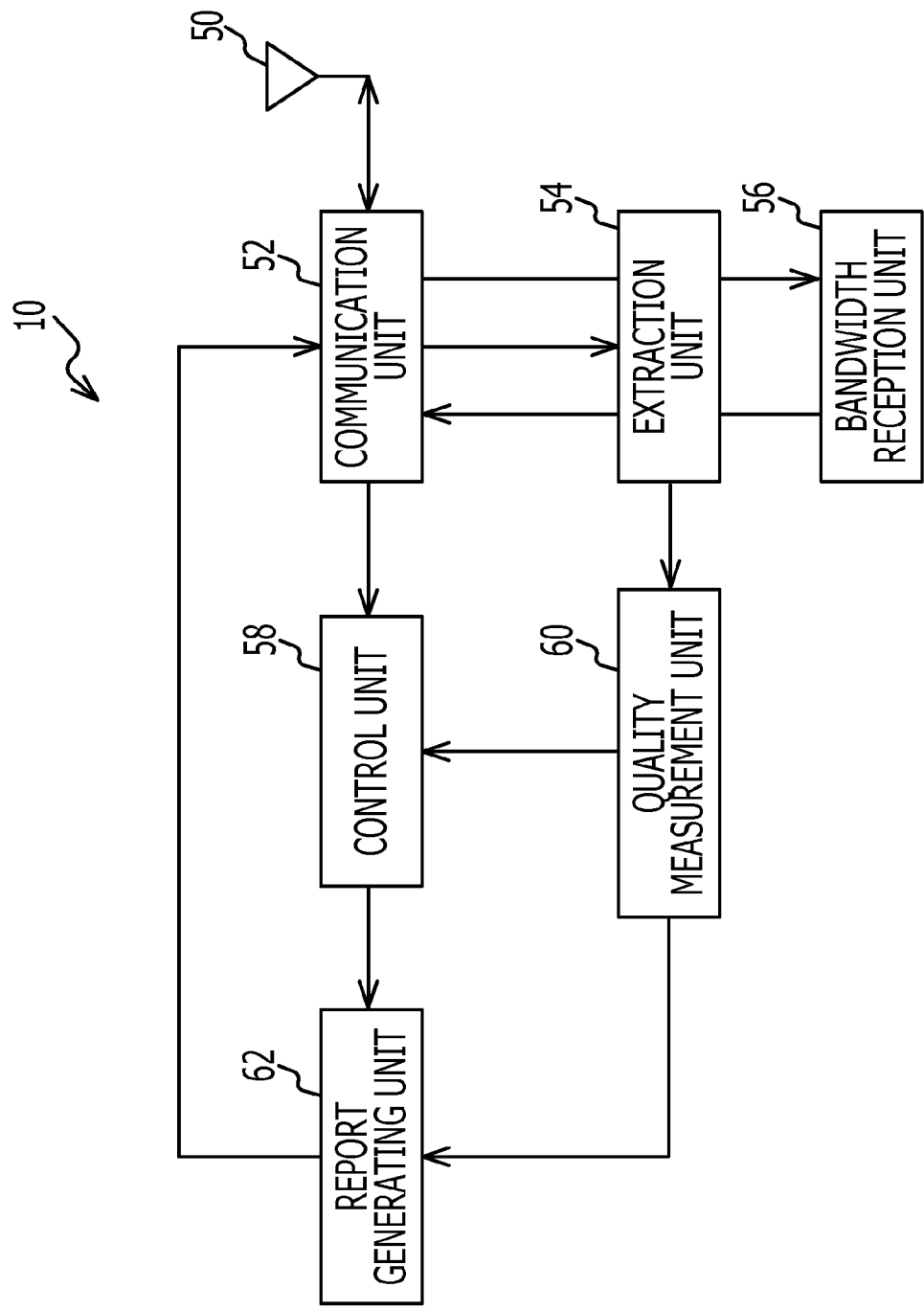
FIG. 8 is a block diagram illustrating a wireless terminal of the second embodiment.

FIG. 8 is a block diagram illustrating the wireless terminal of the second embodiment. As shown in FIG. 8, a communication unit 52 performs transmission/reception of a signal to a base station 20 through an antenna 50. For example, the reception unit 12 and the transmission unit 14 of the first embodiment may correspond to the communication unit 52. An extraction unit 54 extracts information about a report for propagation path quality from the received signal and information about a bandwidth. A quality measurement unit 60 measures the quality of propagation path using information about setting for measurement of the quality of transmission, which is extracted by an extraction unit 54. The report generation unit 62 generates the information about the measured quality of propagation path. The control unit 58 manages the processing for communication connection and the state of connection. The bandwidth reception unit 56 receives the information about the bandwidth extracted by the extraction unit 54 and then sets a bandwidth.

Figure 9:
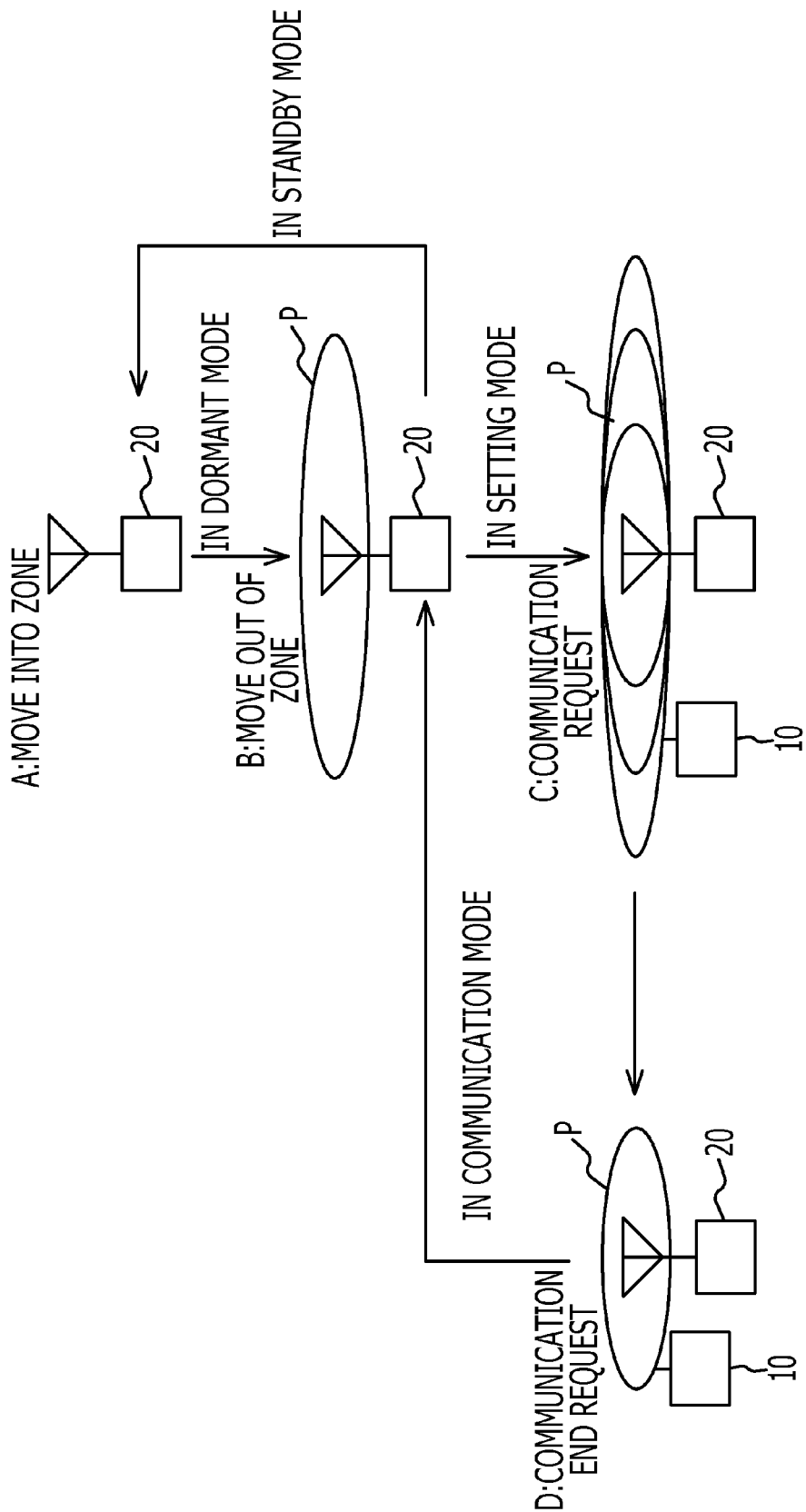
FIG. 9 is a block diagram illustrating the state of the base station device of the second embodiment.

FIG. 9 is a block diagram illustrating the state of the base station device of the second embodiment. Mode A represents a dormant mode. In the dormant mode, the wireless terminal 10 is not located in the zone (in cell C1) of the base station device 20. In this mode, the base station device 20 suspends transmission. Mode B is a standby mode. In mode B, the wireless terminal 10 is located in the zone of the base station device 20. However, the wireless terminal 10 located in the zone of the base station device 20 is not in communication with the base station device 20. In this mode, the setting unit 28 makes the bandwidth the minimum and makes the transmission power per unit bandwidth the maximum. Mode C is a mode in setting. In mode B, when the wireless terminal 10 performs a communication request on the base station device 20, the base station device 20 sets both the bandwidth and the transmission power. Mode D is a communication mode. In mode C, if the setting of bandwidth and transmission power is completed, then the wireless terminal 10 and the base station device 20 are brought into a mode of communication with each other. In mode D, if the wireless terminal 10 is requested to terminate the communication, then the mode changes to mode B to bring the base station device 20 into a standby mode. In mode B, the wireless terminal 10 moves out of the zone and the base station 20 is brought into mode A, a dormant mode.

Figure 10A:
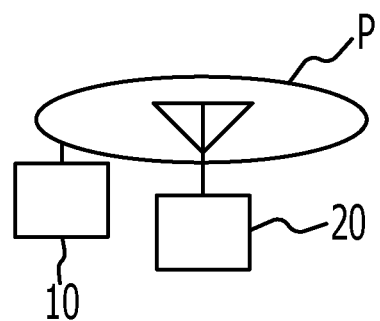
FIGS. 10A and 10B are schematic diagrams illustrating the case where the wireless terminal transmits a communication request to the base station device.
Figure 10B:
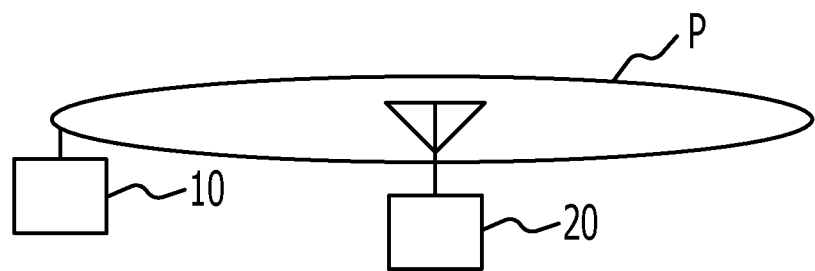
Figure 11A:
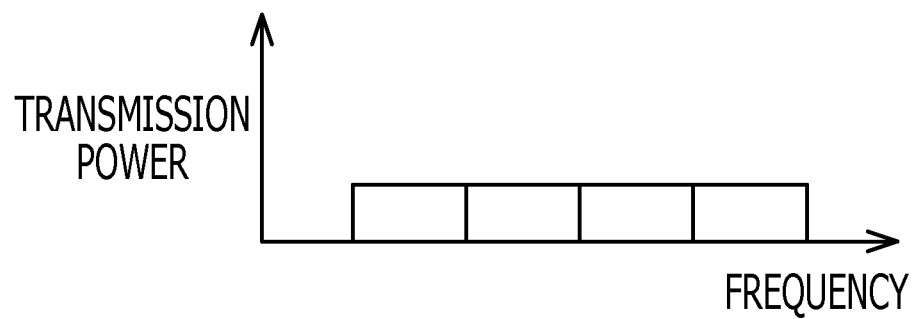
FIGS. 11A and 11B are graphs illustrating the case where the wireless terminal transmits a communication request to the base station device.
Figure 11B:
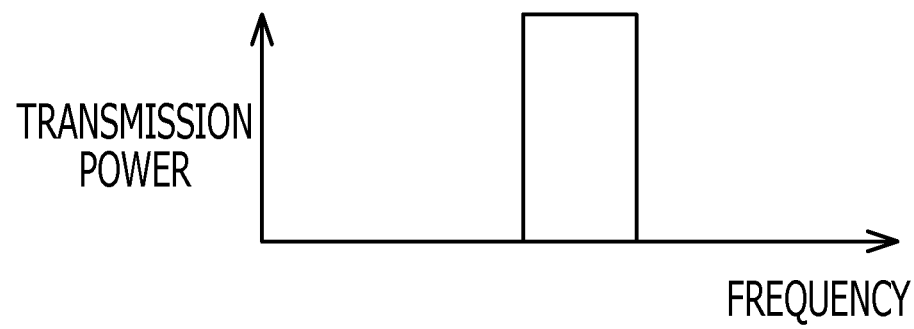

FIG. 10A, FIG. 10B, FIG. 11A, and FIG. 11B are schematic diagrams and graphs illustrating the case where the wireless terminal 10 transmits a communication request to the base station device 20. In FIG. 10A, the wireless terminal 10 is located comparatively close to the base station device 20. Thus, the communication quality between them is good. Therefore, as shown in FIG. 11A, the bandwidth control unit 36 widens the bandwidth of transmission to the wireless terminal 10 and makes the transmission power per unit bandwidth low. In FIG. 10B, the wireless terminal 10 is comparatively far from the base station device 20. Thus, the communication quality between them is bad. Therefore, as shown in FIG. 11B, the bandwidth control unit 36 narrows the bandwidth of transmission to the wireless terminal 10, thereby increasing the transmission power per unit bandwidth.

Figure 12A:
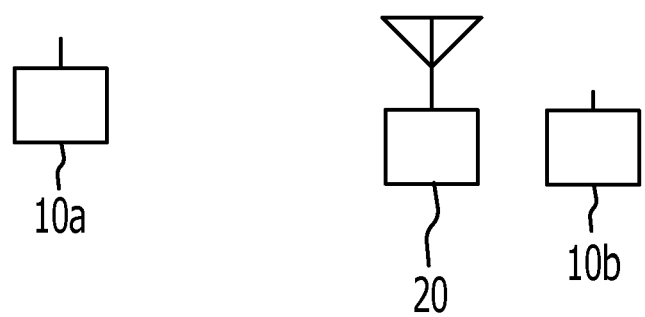
FIG. 12A and FIG. 12B are schematic diagrams each illustrating the case where a plurality of wireless terminals transmits communication requests to the base station device.
Figure 12B:
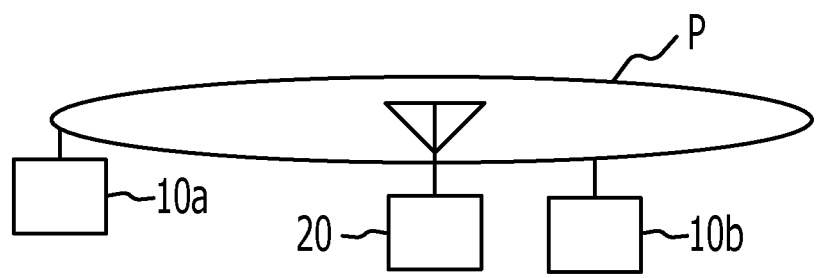
Figure 13:
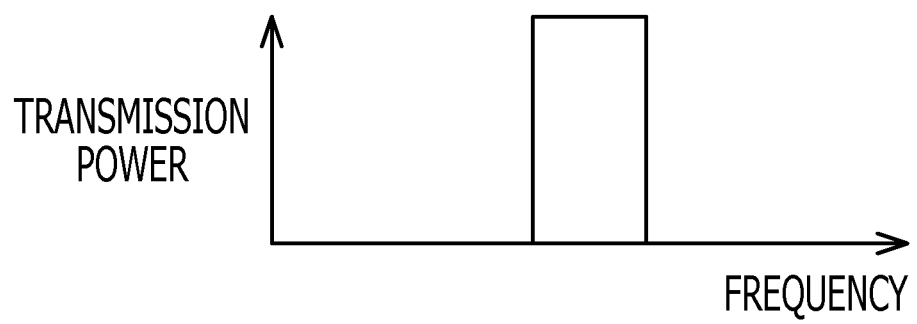
FIG. 13 is a graph illustrating the case where a plurality of wireless terminals transmits communication requests to the base station device.

FIG. 12A, FIG. 12B, and FIG. 13 are schematic diagrams and a graph showing the case where two or more wireless terminals 10 transmit communication requests to the base station device 20 in embodiment 2, respectively. As shown in FIG. 12A, there are wireless communication terminals 10a and 10b in the zone of the base station device 20. As shown in FIG. 12B, if the wireless communication terminals 10a and 10b transmit communication requests to the base station device 20, then the bandwidth control unit 36 sets the transmission power per unit bandwidth so that it will correspond to the wireless terminal 10a or 10b of the worse communication quality. In FIG. 12B, since the wireless terminal 10a is far from the base station device 20, the wireless terminal 10a sets the transmission power per unit bandwidth so that the communication quality between the base station device 20 and the wireless terminal 10a can be maintained. As shown in FIG. 13, the bandwidth control unit 36 sets a narrow bandwidth in order to set a higher transmission power per unit bandwidth.

Figure 14:
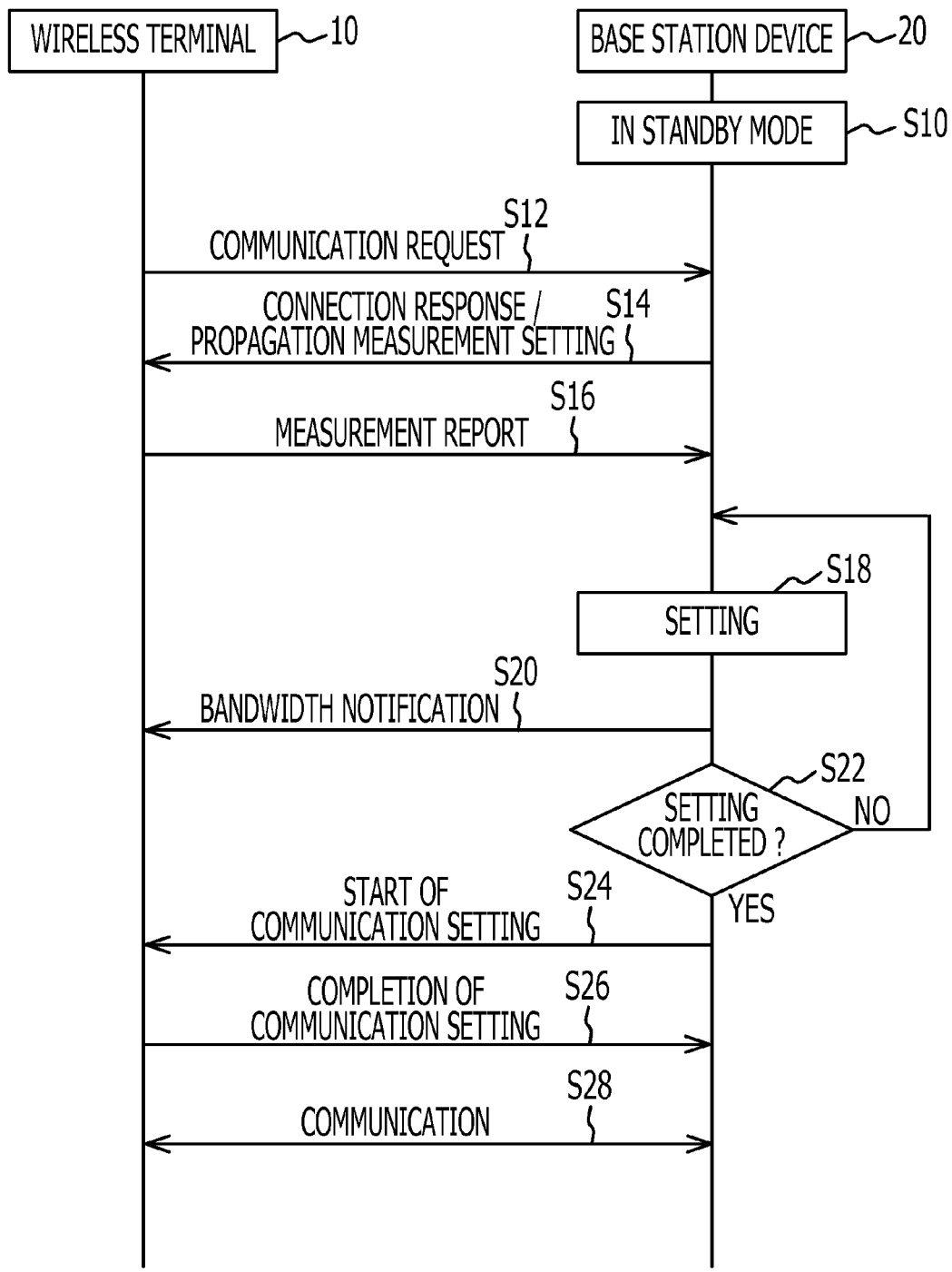
FIG. 14 is a sequence diagram illustrating the case where the wireless terminal requests a communication to the base station device in the second embodiment.

FIG. 14 is a sequence diagram illustrating the case where the wireless terminal requests a communication to the base station device in the second embodiment. In other words, FIG. 14 is a sequence diagram in the case where the base station device 20 changes its mode from mode B to mode D through mode C. The base station device 20 is in the standby mode as represented by mode B in FIG. 14 (step S10). The communication unit 52 of the wireless terminal 10 sets a communication request to the base station device 20 (Step S12). The communication unit 32 of the base station device 20 notifies the wireless terminal 10 of a connection response and the setting of propagation measurement (step S14). The quality measurement unit 60 of the wireless terminal 10 measures communication quality. The communication unit 52 of the wireless terminal 10 transmits the measurement result of communication quality to the base station device 20 (step S16). For example, the transmission unit 14 of the wireless terminal 10 transmits the quality of communication between the wireless terminal 10 and the base station device 20 to the base station device 20. The bandwidth control unit 36 of the base station device 20 sets the transmission power per the bandwidth of a transmitted signal and the unit bandwidth based on the communication quality (step S18). The communication unit 32 of the base station device 20 notifies the wireless terminal 10 of the bandwidth (step S20). For example, the bandwidth to the wireless terminal 10 is transmitted as system information common to two or more wireless terminals. The base station device 20 determines whether the setting is completed (step S22). If it is "No", then the process returns to step S18. If it is "Yes" in step S20, then the communication unit 32 of the base station device 20 transmits the start of communication setting to the wireless terminal 10 (step S24). The communication unit 52 of the wireless terminal 10 transmits the completion of communication setting to the base station device 20 (step S26). The base station device 20 communicates with the wireless terminal 10 using the set transmission bandwidth and the set transmission power per unit transmission bandwidth (step S28).

Figure 15:
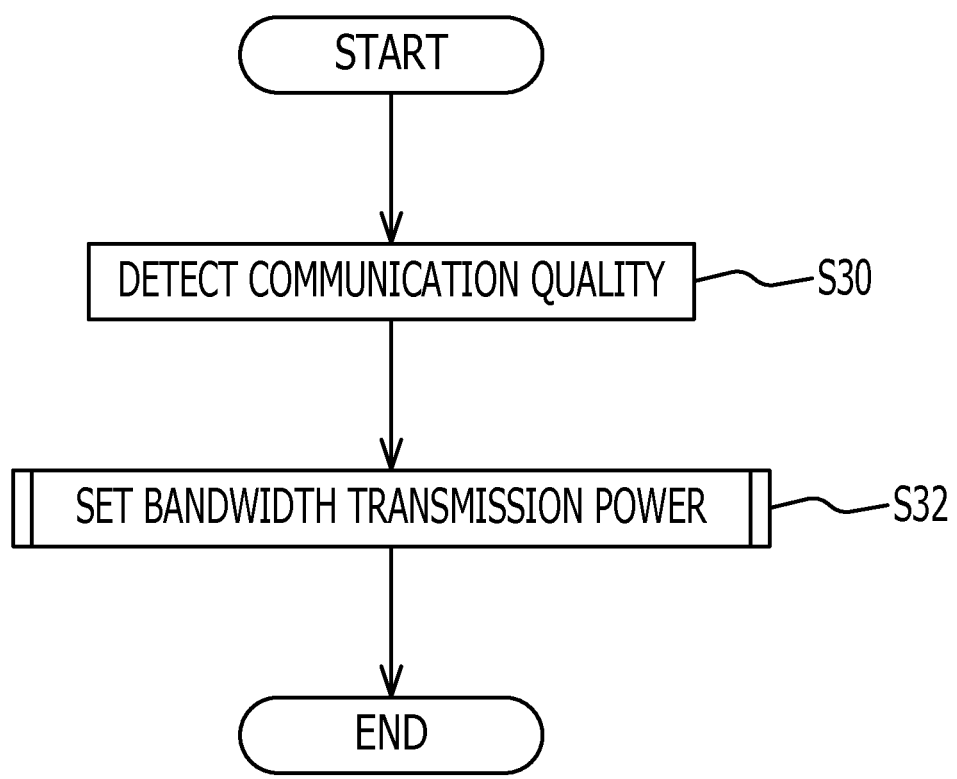
FIG. 15 is a flow chart illustrating a process performed by the base station device in step S18 in FIG. 14.

FIG. 15 is a flow chart illustrating a process performed by the base station device in step S18 in FIG. 14. As shown in FIG. 15, the extraction unit 42 of the base station device 20 detects the quality of communication from each of all the wireless terminals (step S30), the bandwidth control unit 36 sets the transmission bandwidth and the transmission power per unit transmission bandwidth based on the communication quality (step S32).

FIG. 16 is a flow chart illustrating a process performed by the base station device in step S32 in FIG. 15. The bandwidth control unit 36 sets N=0 (Step S40). Here, "N" is a natural number representing the number of times of changing the bandwidth as described below. The bandwidth control unit 36 determines whether "N" is more than "MAX" (step S42). Here, the term "MAX" is the maximum number of times of changing the bandwidth. For example, the "MAX" can be set to four when the bandwidth can be set to any of four different stages of 20 MHz, 15 MHz, 10 MHz and 5 MHz. If it is "No" in step S42, then the extraction unit 42 detects the communication quality of the wireless terminal 10 (step S43). For example, the extraction unit 42 receives the communication quality from each of all the wireless terminals 10.

The bandwidth control unit 36 extracts the worst communication quality W among a plurality of wireless terminals 10 (step S44). The bandwidth control unit 36 determines whether W is "THup" or more (step S46). Here, the "Thup" is a threshold that allows the bandwidth to be increased by one rank. If it is "Yes", then the bandwidth control unit 36 increases the bandwidth to be transmitted from the transmission unit 22 to the wireless terminal 10 to be increased by one rank (step S47). For example, if the bandwidth has been set to 5 MHz, then the bandwidth is changed to 10 MHz. The setting unit 28 lowers a transmission power per unit bandwidth in response to an increase in bandwidth.

If it is "No" in step S46, then the bandwidth control unit 36 determines whether the "W" is not more than "Thdown" (step S48). Here, term "Thdown" is a threshold that allows the bandwidth to be decreased by one rank. If it is "Yes", then the bandwidth control unit 36 allows the bandwidth to be transmitted from the communication unit 32 to the wireless terminal 10 to be decreased by one rank. For example, if the bandwidth has been set to 20 MHz, then the bandwidth is changed to 15 MHz. The bandwidth control unit 36 increases a transmission power per unit bandwidth in response to a decrease in bandwidth. In step S48, if it is "No", the bandwidth control unit 36 does not change the bandwidth and the transmission per unit bandwidth (step S52).

The bandwidth control unit 36 notifies each of all the wireless terminals 10 of the bandwidth and the transmission power per unit bandwidth through the bandwidth notification unit 40 (step S56). The bandwidth control unit 36 increments "N" (step S58). The bandwidth control unit 36 receives the setting of the bandwidth from the wireless terminal 10. As a result, the transmission bandwidth and the transmission power per unit transmission bandwidth are set (step S60). Then, the process returns to step S42. If it is "Yes" in step S42, then the process is completed. In this way, by repeating a sequence from step S42 to step S60 for "MAX" times, both the bandwidth and the transmission power per unit bandwidth can be set. Furthermore, it may be determined as "Yes" in step S42 even when the parameters are changed fewer number of times than "MAX" if the process passes through step S52.

As shown in FIG. 16, if there are two or more wireless terminals 10 in the zone, then the bandwidth control unit 36 sets the above transmission power as well as the bandwidth corresponding to the wireless terminal of the worst communication quality. As a result, the communication quality of each of all the wireless terminals 10 in the zone can be ensured.

FIG. 17 is a sequence diagram illustrating the case where the wireless terminal in communication sends a communication end request to the base station device in the second embodiment. In other words, FIG. 17 is a sequence diagram illustrating the case where the base station device 20 is changed from mode D to mode B in FIG. 9. As shown in FIG. 17, the communication terminal 10 communicates with the base station device 20 (step S28). For example, the wireless terminal 10 reports the measurement result of communication quality to the base station device 20 (step S16). The wireless terminal 10 transmits a communication end request to the base station device 20 (step S30). The base station device 20 transmits a communication end response to the wireless terminal 10 (step S32). Then, the bandwidth control unit 36 of the base station device 20 confirms whether any of other communication terminals 10 is connected to the base station terminal 20 as a setting confirmation procedure (step S34). The bandwidth control unit 36 makes the bandwidth the narrowest and the transmission per unit bandwidth the highest (step S36). In this state, the base station device 20 enters in standby mode (step S38). In the standby mode, the base station device 20 cannot recognize the communication quality of the wireless terminal 10 in the zone. However, the base station device 20 transmits signals to the unconnected wireless terminal 10 in the zone, intermittently. Then, the bandwidth control unit 36 makes the transmission power per unit bandwidth the highest. Therefore, in this way, the base station device 20 can transmit signals to the unconnected wireless terminal 10 in the zone, intermittently.

In a third embodiment, a base station device 20 in communication with a wireless terminal 10*a* receives a communication request from another wireless terminal 10*b*. The block diagram of the base station device 20 and the wireless terminal 10 of the second embodiment apply to the third embodiment, so that the description thereof will be omitted.

Figure 18A:
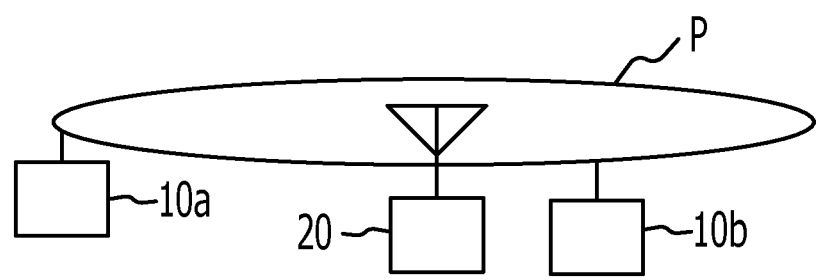
FIG. 18A and FIG. 18B are schematic diagrams illustrating an example of the case that, in a third embodiment, a base station device 20 in communication with a wireless terminal 10a receives a communication request from another wireless terminal 10b.
Figure 18B:
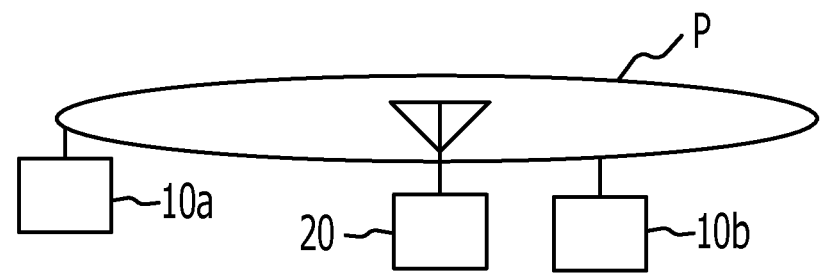
Figure 19A:
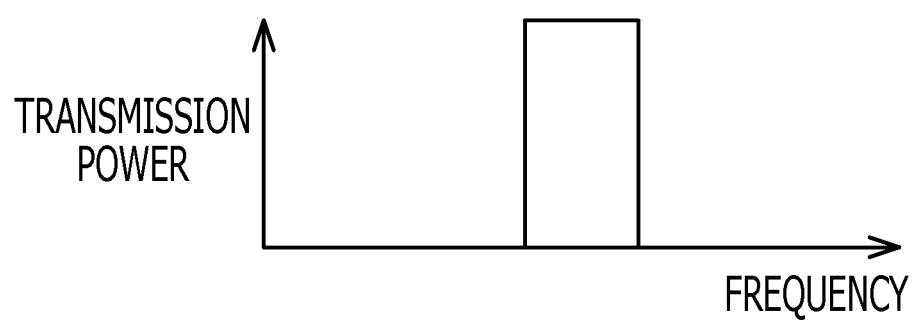
FIG. 19A and FIG. 19B are graphs illustrating an example of the case that, in a third embodiment, a base station device 20 in communication with a wireless terminal 10a receives a communication request from another wireless terminal 10b.

FIG. 18A, FIG. 18B, FIG. 19A, and FIG. 19B are schematic diagrams and graphs illustrating an example of the case that, in the third embodiment, the base station device 20 in communication with the wireless terminal 10*a* receives the communication request from another wireless terminal 10*b*. As shown in FIG. 18A, the communication terminal 10*a* communicates with the base station device 20. The wireless terminal 10*a* is far from the base station device 20, compared with the wireless terminal 10*b*. The communication terminal 10*b* does not communicate with the base station device 20 now. Since the wireless terminal 10*a* is far from the base station device 20, as shown in FIG. 19A, the bandwidth control unit 36 narrows the bandwidth, thereby increasing the transmission power per unit bandwidth.

Figure 19B:
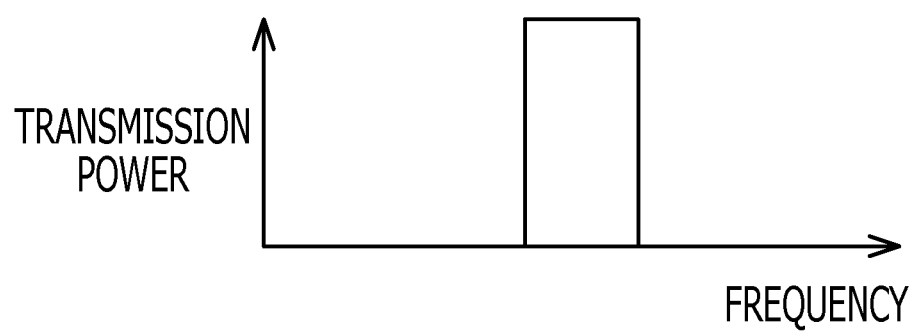

As shown in FIG. 18B, the communication terminal 10*b* transmits a communication request to the base station device 20. Since the wireless terminal 10*a* is far from the base station device 20, compared with the wireless terminal 10*b*, the communication quality of the wireless terminal 10*a* is worse than the communication quality of the wireless terminal 10*b*. Therefore, as shown in FIG. 19B, the bandwidth control unit 36 retains the narrow bandwidth and retains the transmission power per unit bandwidth in high setting.

Figure 20A:
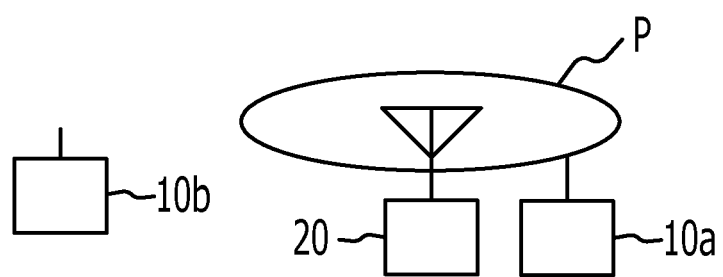
FIG. 20A and FIG. 20B are schematic diagrams illustrating another example of the case in the third embodiment where the base station device 20 in communication with the wireless terminal 10a receives a communication request from another wireless terminal 10b.
Figure 20B:
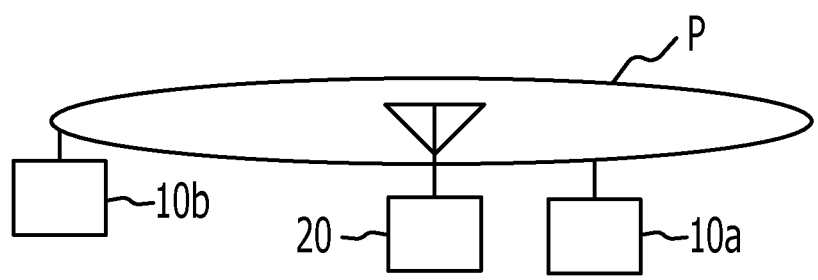
Figure 21A:
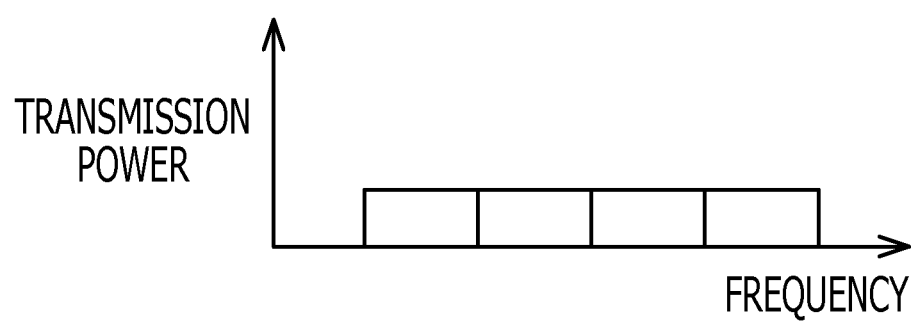
FIG. 21A and FIG. 21B are graphs illustrating another example of the case in the third embodiment where the base station device 20 in communication with the wireless terminal 10a receives a communication request from another wireless terminal 10b.

FIG. 20A, FIG. 20B, FIG. 21A, and FIG. 21B are schematic diagrams and graphs illustrating another example of the case in the third embodiment where the base station device 20 in communication with the wireless terminal 10*a* receives a communication request from another wireless terminal 10*b*. As shown in FIG. 20A, the wireless terminal 10*a* is located near the base station device 20, compared with the wireless terminal 10*b*. The wireless terminal 10*b* does not communicate with the base station device 20 now. Since the base station device 10*a* is located near the base station device 20, as shown in FIG. 21A, the bandwidth control unit 36 is set so that it extends the bandwidth and reduces the transmission power per unit bandwidth.

Figure 21B:
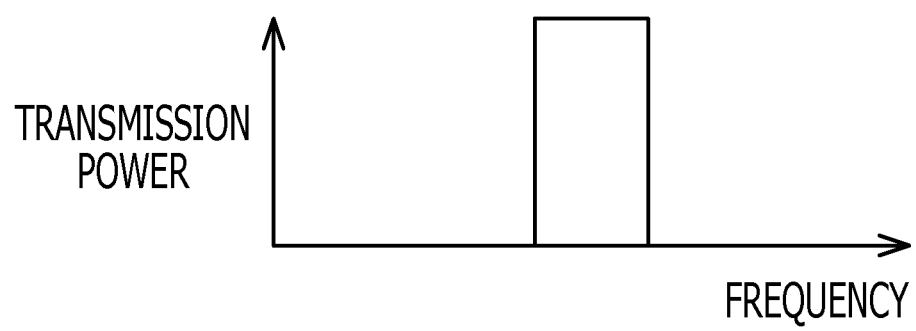

As shown in FIG. 20B, the wireless terminal 10*b* transmits a communication request to the base station device 20. Since the wireless terminal 10*b* is far from the base station device 20, compared with the wireless terminal 10*a*, the communication quality of the wireless terminal 10*b* is worse than that of the wireless terminal 10*a*. Therefore, as shown in FIG. 21B, the bandwidth control unit 36 narrows the bandwidth and increases the transmission power per unit bandwidth.

Figure 22A:
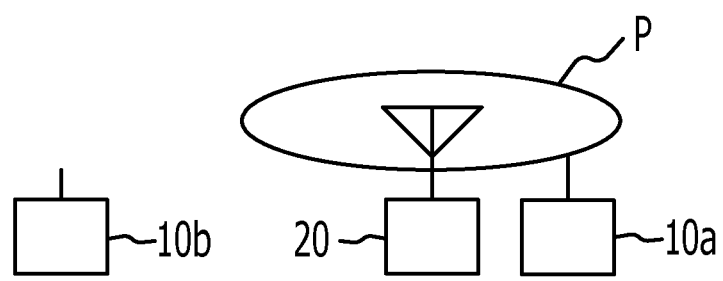
FIG. 22A and FIG. 22B are schematic diagrams illustrating still another example of the case in the third embodiment where the base station device 20 in communication with the wireless terminal 10a receives a communication request from another wireless terminal 10b.
Figure 22B:
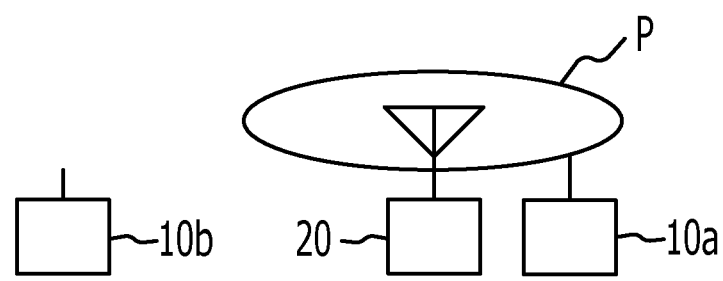
Figure 23A:
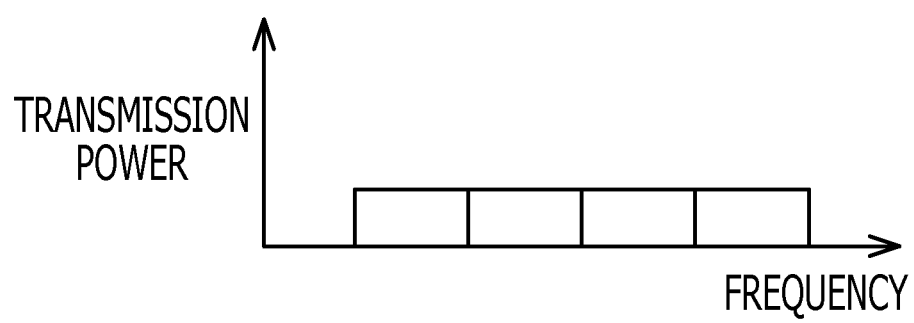
FIG. 23A and FIG. 23B are graphs illustrating still another example of the case in the third embodiment where the base station device 20 in communication with the wireless terminal 10a receives a communication request from another wireless terminal 10b.

FIG. 22A, FIG. 22B, FIG. 23A, and FIG. 23B are schematic diagrams and graphs illustrating still another example of the case in the third embodiment where the base station device 20 in communication with the wireless terminal 10*a* receives a communication request to the base station device 20 from another wireless terminal 10*b*. FIG. 22A and FIG. 23A are the same as FIGS. 20A and 21A and thus the detailed description thereof will be omitted. In other words, as shown in FIG. 23A, the bandwidth control unit 36 extends the bandwidth and reduces the transmission power per unit bandwidth.

Figure 23B:
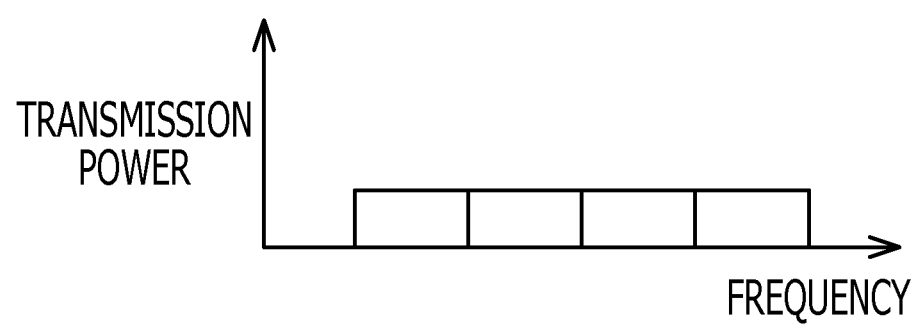

As shown in FIG. 22B, the wireless terminal 10*b* transmits a communication request to the base station device 20. However, the base station device 20 does not permit connection of the wireless terminal 10*b*. Therefore, as shown in FIG. 23B, the bandwidth control unit 36 retains the extended bandwidth and retains the setting of making the transmission power per unit bandwidth low.

Figure 24:
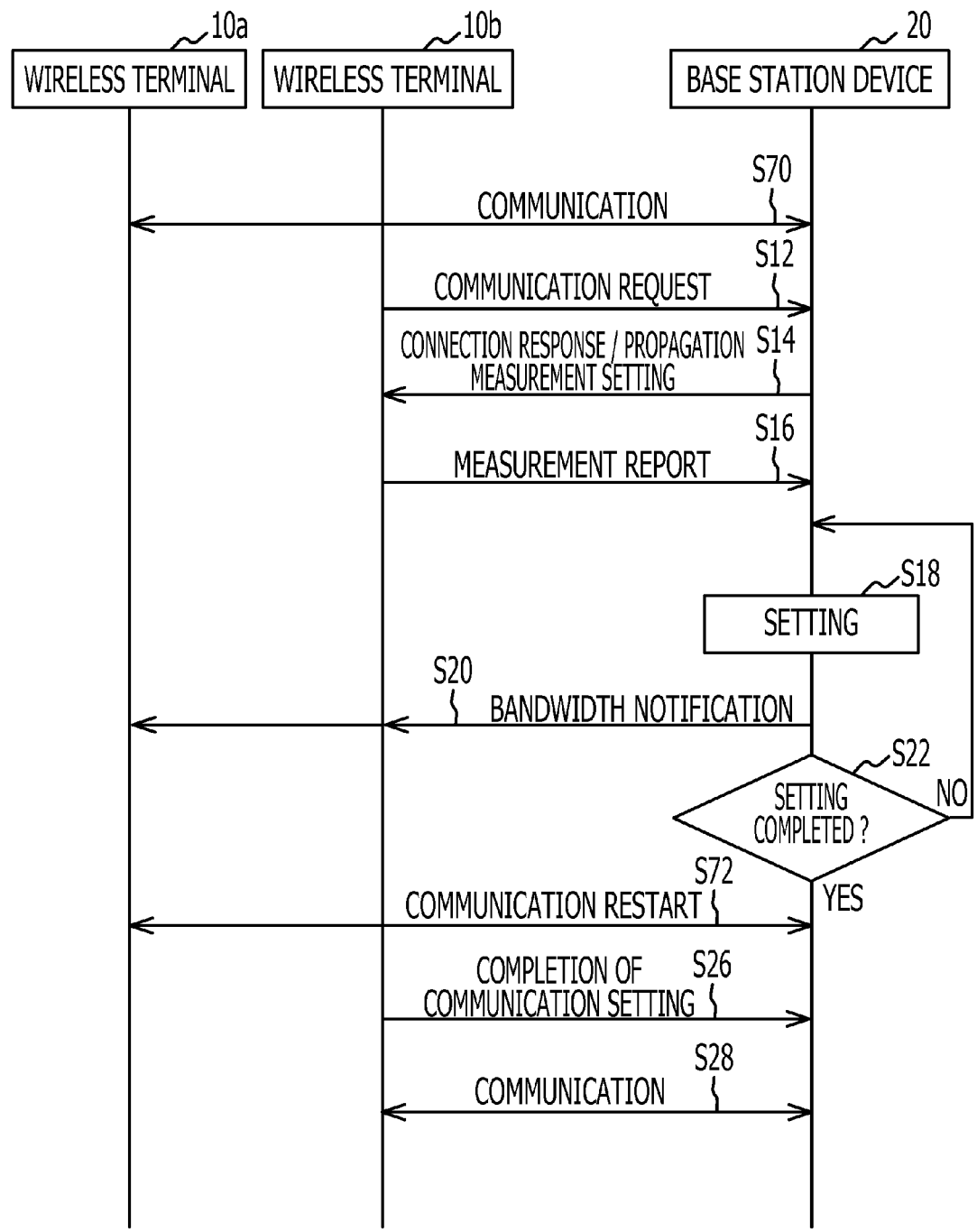
FIG. 24 is a sequence diagram of the base station device 20 and the wireless terminals 10a and 10b in the third embodiment.

FIG. 24 is a sequence diagram of the base station device 20 and the wireless terminals 10*a* and 10*b* in the third embodiment. The wireless terminal 10*a* and the base station device 20 are in communication with each other (step S70). The wireless terminal 10*b* transmits a communication request to the base station device 20 (step S12). Steps S14 to S18 are the same as those of the second embodiment shown in FIG. 14, so that their respective descriptions will be omitted. In step S20, the base station device 20 notifies the wireless terminals 10*a* and 10*b* of their respective bandwidths. After step S22, the base station device 20 restarts its communication with the wireless terminal 10*a* (step S72). Steps S26 to S28 are the same as those shown in FIG. 14, so that their respective descriptions will be omitted.

Figure 25:
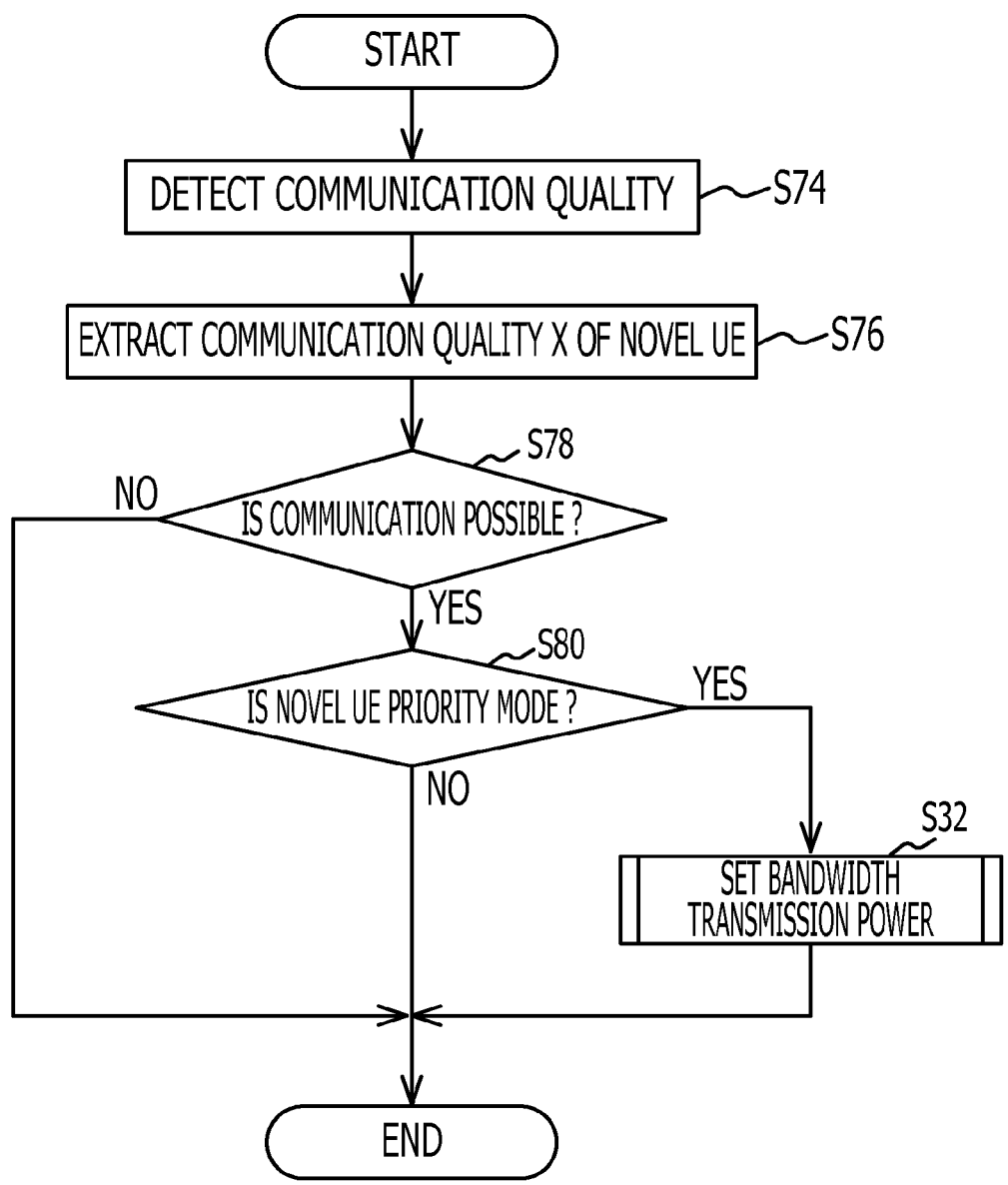
FIG. 25 is a flow chart illustrating a process performed by the base station device 20 in step S18 in FIG. 24.

FIG. 25 is a flow chart illustrating a process performed by the base station device 20 in step S18 in FIG. 24. The extraction unit 42 detects the quality of communication from the wireless terminal 10*a* in connection (or preferably from each of all the wireless terminals) (step S74). The extraction unit 42 extracts the communication quality of the wireless terminal 10*b* that generates a new request of communication (step S76). The bandwidth control unit 36 determines whether the wireless terminal 10*b* can communicate with the base station device 20 at the present bandwidth (Step S78). If it is "No", then the process is ended. If it is "Yes", then the bandwidth control unit 36 determines whether the wireless terminal 10*b* is in a priority mode (step S80). If it is "No", then the process is ended. In other words, the bandwidth control unit 36 does not change the bandwidth and the transmission power per unit bandwidth. If it is "Yes" in step S80, the bandwidth and the transmission power per unit bandwidth is set in a manner similar to FIG. 16 (step S32).

Here, the wireless terminal 10 is provided with a first communication mode and a second communication mode, where the priority of the second communication mode is lower than that of the first one, as modes for communication between the wireless terminal 10 and the base station device 20. The priority of a communication mode is defined depending on, for example, the quality of service (QoS), specifically the priority of a bearer. For example, priorities in the communication mode may include an emergency contact, a voice call, a streaming service, a web service, and so on. In the third embodiment, a communication mode with a certain priority or more is referred to as a first communication mode and any mode other than the first mode is referred to as a second mode.

According to FIG. 20A of the third embodiment, the communication quality of the wireless terminal 10*b* with a new communication request is worse than that of the wireless communication terminal having the worst communication quality among the wireless communication terminals in communication with one or two or more base station devices 20 in the zone. In this case, as shown in FIG. 21B, the bandwidth control unit 36 sets the bandwidth to be narrower than one previously defined and also sets the transmission power per unit bandwidth to be higher than one previously defined. As a result, even if the communication quality of the wireless terminal 10*b* which generates a new communication request is worse, the transmission power per unit bandwidth can be appropriately set. On the other hand, as shown in FIG. 18A, if the communication quality of the wireless terminal 10*b* is better than the wireless communication terminal 10*a* having the worst communication quality, then the bandwidth control unit 36 does not change the bandwidth and the transmission power as shown in FIG. 19B. Therefore, the wireless terminal 10*a* can ensure the bandwidth and then ensure the transmission rate of a signal.

Furthermore, as shown in step S80 in FIG. 25, if the wireless terminal 10*b* is in the second communication mode, the bandwidth control unit 36 does not change the bandwidth and the transmission power per unit bandwidth. Therefore, if the communication quality of the wireless terminal 10*b* is worse than the wireless communication terminal 10*a* having the worst communication quality among one or two or more wireless terminals in communication in the zone, then the bandwidth control unit 36 does not change the bandwidth and the transmission power. When the bandwidth of a signal transmitted from the base station device 20 is changed, the communication between the base station device 20 and the wireless terminal 10*a* may be temporarily interrupted. In the third embodiment, if the communication priority of the wireless terminal 10*b* is low, then the base station device 20 can refuse the connection of the wireless terminal 10*b*. Thus, the bandwidth control unit 36 can be allowed to retain the bandwidth and the transmission power per unit bandwidth.

Furthermore, the base station device 20 makes a comparison between the priority of the wireless terminal 10*a* and the priority of the wireless terminal 10*b*. If the priority of the wireless terminal 10*b* is higher than that of the wireless terminal 10*a*, then the connection of the wireless terminal 10*b* may be permitted. The base station device 20 may refuse the connection of the wireless terminal 10*b* if the priority of the wireless terminal 10*b* is low.

Embodiment 4

In a fourth embodiment, a base station device 20 in communication with both a wireless terminal 10*c* and a wireless terminal 10*d* receives a communication end request from the wireless terminal 10*d*. The block diagram of the base station device 20 and the wireless terminal 10 is the same as that of the second embodiment, so that the description thereof will be omitted.

Figure 26A:
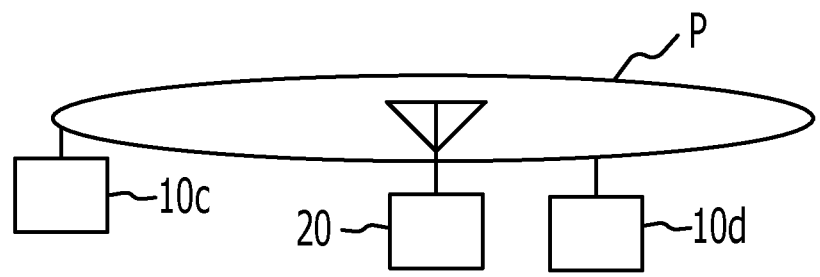
FIG. 26A and FIG. 26B are schematic diagrams illustrating an example of the case in a fourth embodiment where a base station device 20 in communication with both a wireless terminal 10c and a wireless terminal 10d receives a communication end request from the wireless terminal 10d.
Figure 26B:
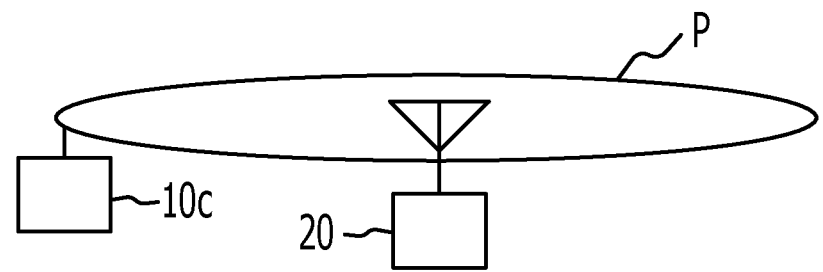
Figure 27A:
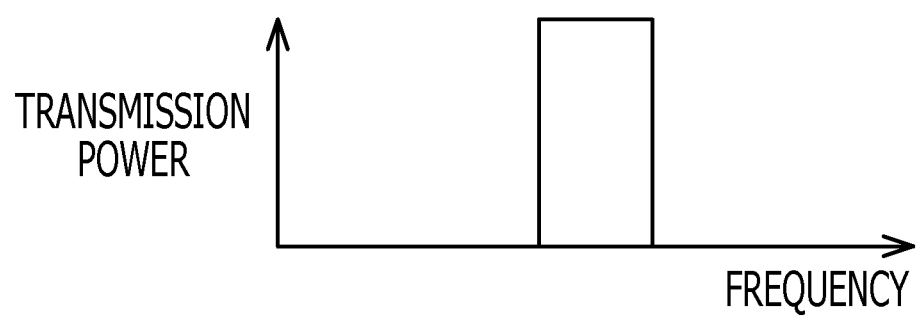
FIG. 27A and FIG. 27B are graphs illustrating an example of the case in a fourth embodiment where a base station device 20 in communication with both a wireless terminal 10c and a wireless terminal 10d receives a communication end request from the wireless terminal 10d.

FIG. 26A, FIG. 26B, FIG. 27A, and FIG. 27B are schematic diagrams and graphs illustrating an example of the case in the fourth embodiment where the base station device 20 in communication with both the wireless terminal 10*c* and the wireless terminal 10*d* receives a communication end request from the wireless terminal 10*d*. As shown in FIG. 26A, the communication terminals 10*c* and 10*d* communicate with the base station device 20. The wireless terminal 10*c* is far from the base station device 20, compared with the wireless terminal 10*d*. Therefore, as shown in FIG. 27A, the bandwidth control unit 36 narrows the bandwidth of transmission to the wireless terminal 10*c* to ensure the quality of communication with the wireless terminal 10*c*, thereby setting to increase the transmission power per unit bandwidth.

Figure 27B:
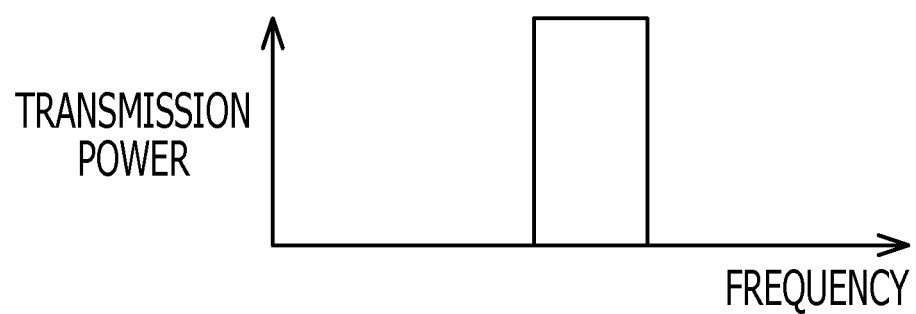

As shown in FIG. 26B, the communication terminal 10*d* transmits a communication end request to the base station device 20. Since the wireless terminal 10*c* is far from the base station device 20, compared with the wireless terminal 10*d*, the communication quality of the wireless terminal 10*c* is worse than that of the wireless terminal 10*d*. Therefore, as shown in FIG. 27B, even if the connection between the wireless terminal 10*d* and the base station device 20 is terminated, the bandwidth control unit 36 retains the narrow bandwidth and retains the transmission power per unit bandwidth in high.

Figure 28A:
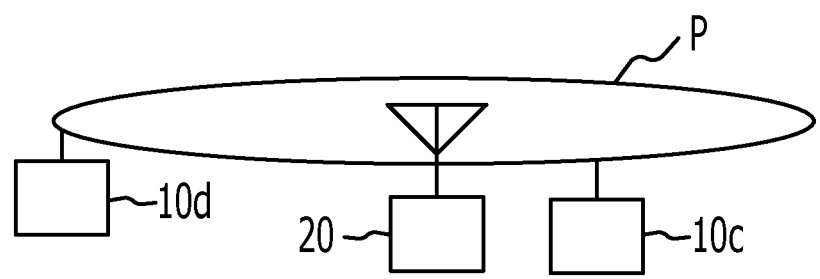
FIG. 28A and FIG. 28B are schematic diagrams illustrating another example of the case in the fourth embodiment where the base station device 20 in communication with both the wireless terminal 10c and the wireless terminal 10d receives a communication end request from the wireless terminal 10d.
Figure 28B:
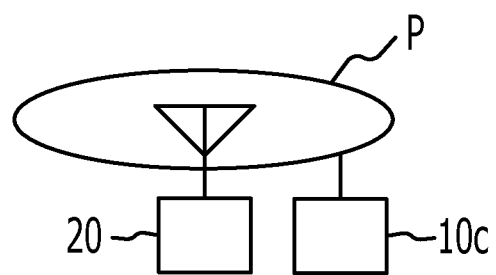
Figure 29A:
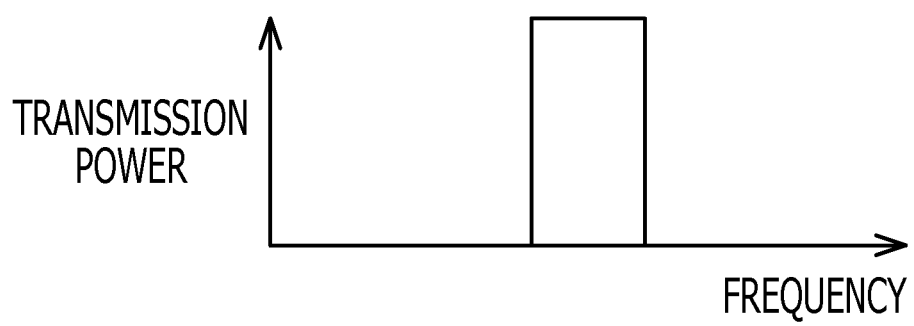
FIG. 29A and FIG. 29B are schematic diagrams illustrating another example of the case in the fourth embodiment where the base station device 20 in communication with both the wireless terminal 10c and the wireless terminal 10d receives a communication end request from the wireless terminal 10d.

FIG. 28A, FIG. 28B, FIG. 29A, and FIG. 29B are schematic diagrams and graphs illustrating another example of the case in the fourth embodiment where the base station device 20 in communication with both the wireless terminal 10*c* and the wireless terminal 10*d* receives a communication end request from the wireless terminal 10*d*. As shown in FIG. 28A, the wireless terminal 10*c* is located near the base station device 20, compared with the wireless terminal 10*d*. Therefore, as shown in FIG. 29A, the bandwidth control unit 36 narrows the bandwidth of transmission to ensure the quality of communication with the wireless terminal 10*d*, thereby setting to increase the transmission power per unit bandwidth.

Figure 29B:
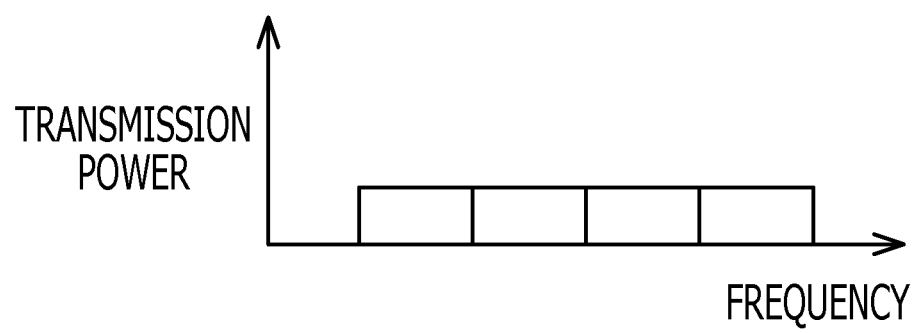

As shown in FIG. 28B, the communication terminal 10*d* transmits a communication end request to the base station device 20. The wireless terminal 10*d* which now ends the communication is far from the base station device 20, compared with the wireless terminal 10*c*. Therefore, as shown in FIG. 29B, the bandwidth control unit 36 widens the bandwidth enough to keep the quality of communication with the wireless terminal 10*c*, while making the transmission power per unit bandwidth low.

Figure 30A:
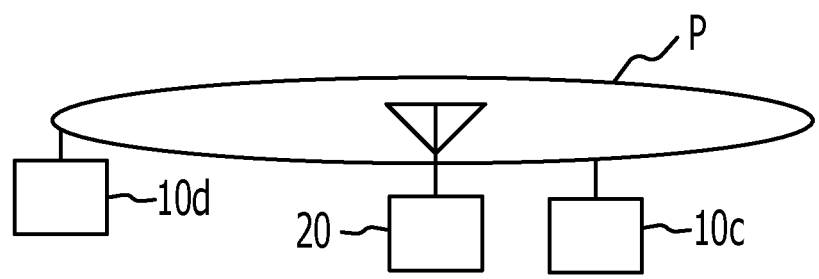
FIG. 30A and FIG. 30B are schematic diagrams illustrating still another example of the case in the fourth embodiment where the base station device 20 in communication with both the wireless terminal 10c and the wireless terminal 10d receives a communication end request from the wireless terminal 10d.
Figure 30B:
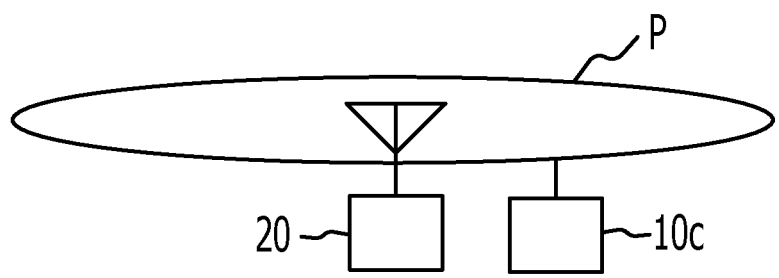
Figure 31A:
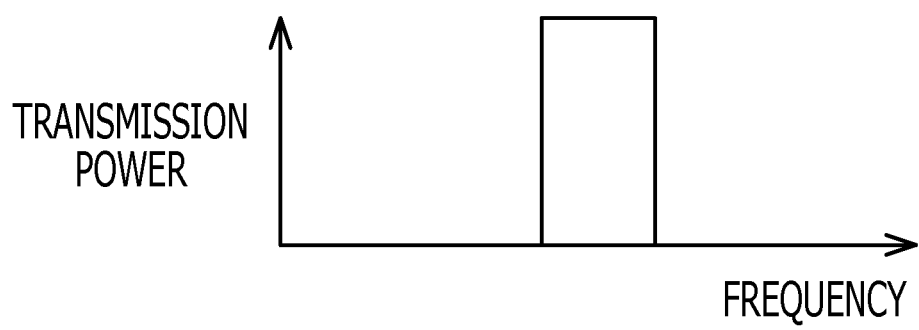
FIG. 31A, and FIG. 31B are graphs illustrating still another example of the case in the fourth embodiment where the base station device 20 in communication with both the wireless terminal 10c and the wireless terminal 10d receives a communication end request from the wireless terminal 10d.

FIG. 30A, FIG. 30B, FIG. 31A, and FIG. 31B are schematic diagrams and graphs illustrating still another example of the case in the fourth embodiment where the base station device 20 in communication with both the wireless terminal 10*c* and the wireless terminal 10*d* receives a communication end request from the wireless terminal 10*d*. FIG. 30A and FIG. 31A are the same as FIGS. 28A and 29A and thus the detailed description thereof will be omitted.

Figure 31B:
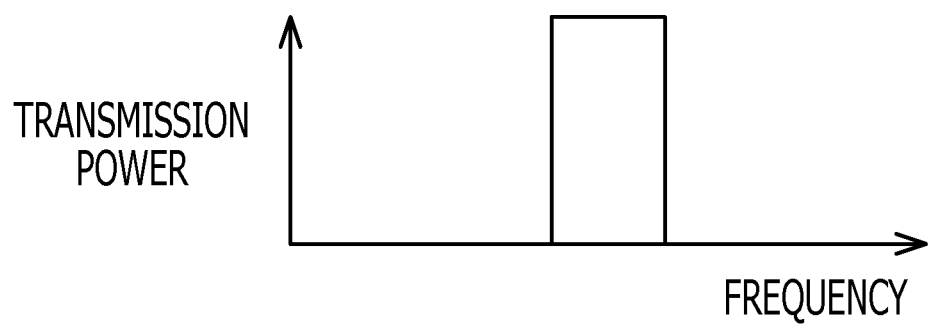

As shown in FIG. 30B, the communication terminal 10*d* transmits a communication end request to the base station device 20. Therefore, the communication terminal 10*d* ends its communication with the base station device 20. However, the wireless terminal 10*c* is performing high-priority communication. For this reason, as shown in FIG. 31B, the bandwidth control unit 36 does not change the bandwidth.

Figure 32:
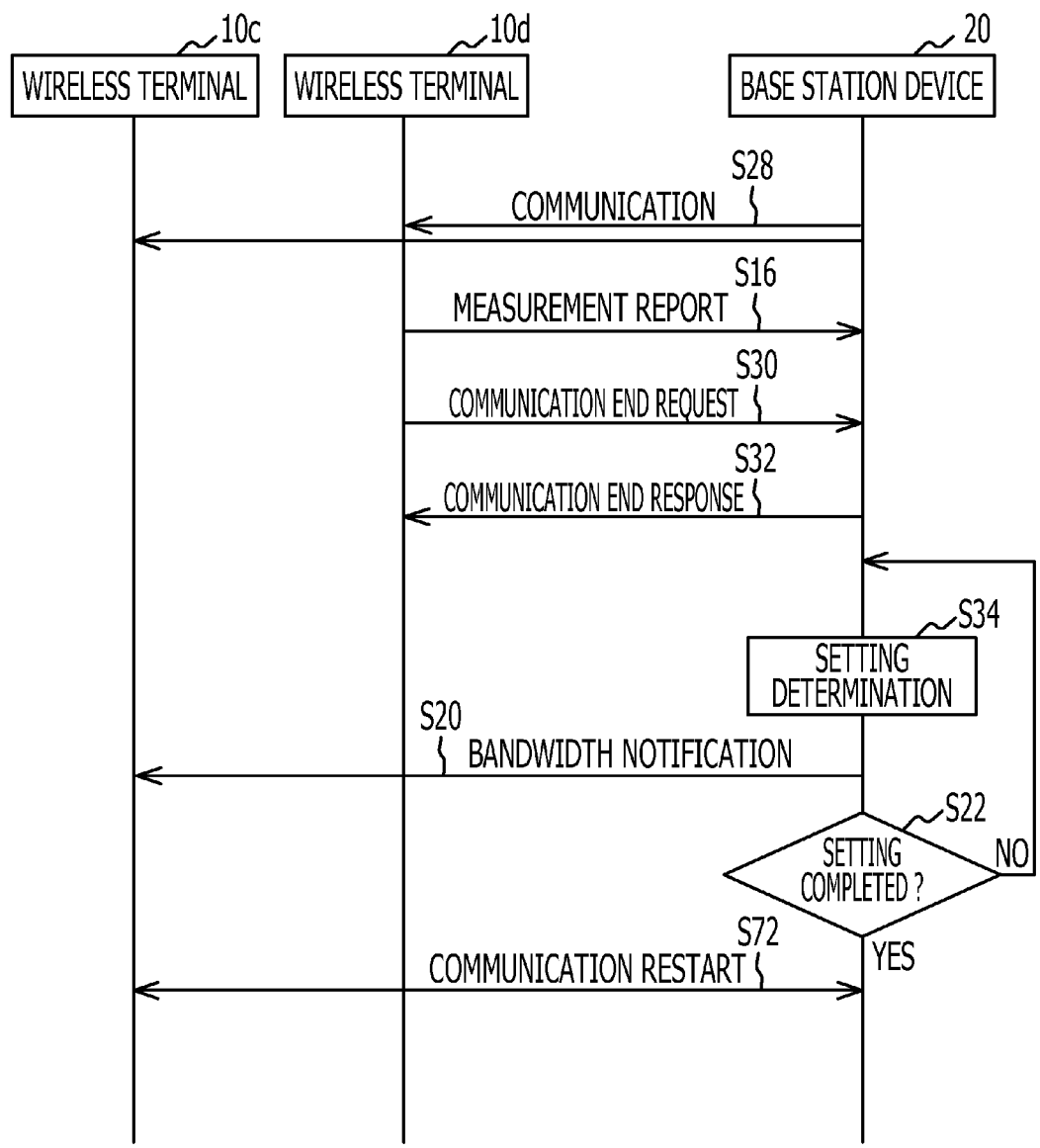
FIG. 32 is a sequence diagram of the base station device 20 and the wireless terminals 10c and 10d in the fourth embodiment.

FIG. 32 is a sequence diagram of the base station device 20 and the wireless terminals 10*c* and 10*d* in the fourth embodiment. The wireless terminals 10*c* and 10*d* and the base station device 20 are in communication with each other (step S28). The wireless terminal 10*d* measures communication quality. The wireless terminal 10*d* transmits the measurement result of communication quality to the base station device 20 (step S16). The wireless terminal 10*d* transmits a communication end request to the base station device 20 (step S30). The base station device 20 transmits a communication end response to the wireless terminal 10*d* (step S32). The base station device 20 determines the setting of the bandwidth and the transmission power per the bandwidth (step S34). The base station device 20 notifies the wireless terminal 10*c* of the bandwidth (step S20). The base station device 20 determines whether the setting is completed (step S22). If it is "No", then the process returns to step S34. If it is "Yes" in step S22, then the base station device 20 and the wireless terminal 10*c* restart their communication with each other (step S72).

FIG. 33 is a flow chart illustrating a process of the base station device in step S34 in FIG. 32. The extraction unit 42 detects the quality of communication from a plurality of wireless terminals 10*c* and 10*d* (or preferably all the wireless terminals) currently in communication (step S84). The extraction unit 42 extracts the communication quality Y of the wireless terminal 10*d* that generates a communication end request (step S86). The bandwidth control unit 36 determines whether there is a wireless terminal where the communication quality thereof is worse than communication quality Y (step S88). If it is "Yes", then the bandwidth control unit 36 does not change the bandwidth and the transmission power per unit bandwidth. If it is "No", then the bandwidth control unit 36 determines whether the wireless terminal of the first priority mode is the wireless terminal 10*c* in continuous communication (step S90). If it is "Yes", then the bandwidth control unit 36 does not change the bandwidth and the transmission power per unit bandwidth. If it is "No", the bandwidth and the transmission power per unit bandwidth is set in a manner similar to FIG. 16 (step S32).

In the case illustrated in FIG. 28A of the fourth embodiment, the communication quality of the wireless terminal 10*d* with a communication end request is worse than that of the wireless communication terminal 10*c* in communication in the zone. In this case, as shown in FIG. 29B, the bandwidth control unit 36 sets the bandwidth to be wider than one previously defined and also sets the transmission power per unit bandwidth to be lower than one previously defined. Therefore, the bandwidth and the transmission power per unit bandwidth can be equal to those of a wireless terminal in successive communication. On the other hand, as shown in FIG. 26A, if the wireless terminal 10*d* is not a wireless terminal with the worst communication quality, the bandwidth control unit 36 as shown in FIG. 27B does not change the bandwidth and the transmission power per unit bandwidth. Therefore, the communication quality of the wireless terminal 10*c* in successive communication can be retained.

As shown in step S90 in FIG. 33, if the wireless terminal in successive communication 10*c* is in the first communication mode, the bandwidth control unit 36 does not change the bandwidth and the transmission power per unit bandwidth. Therefore, if the communication quality of the wireless terminal 10*d* is worse than the wireless communication terminal 10*c*, then the bandwidth control unit 36 does not change the bandwidth and the transmission power. Therefore, in the high-priority communication, the communication can be prevented from being interrupted.

In any of the first to fourth embodiments, the femto base station has been described as the base station device 20. In addition, the macro base station device has been described as the base station device 30. Alternatively, the base station devices 20 and 30 may be any of other kinds of base stations. In any of the first to fourth embodiments, the base station device 30 may be set to the same bandwidth and the same transmission power per unit bandwidth as those of the base station device 20. In any of the first to fourth embodiments, one base station device 20 present in the cell C0 has been described as an example. Alternatively, for example, two or more base station devices 20 may be present. In this case, each of the base station devices 20 may be provided with the bandwidth and the transmission power per unit bandwidth, which are set based on the quality of reception reflecting a propagation environment including the interference between cells. Therefore, the setting can be appropriately performed on the entire system. In the first to fourth embodiments, the setting unit 28 and the bandwidth control unit 36 have been described as those in the case of setting the bandwidth of a signal transmitted from the base station device 20 to the wireless terminal 10 as well as a transmission power per unit bandwidth. The setting unit 28 or the bandwidth control unit 36 may set the bandwidth of a signal transmitted from the base station device 20 to the wireless terminal 10 and a transmission power per unit bandwidth in conjunction with a signal transmitted from the base station device 20 to the wireless terminal 10.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

The invention claimed is:

1. A communication system comprising a plurality of wireless terminals and a base station device that wirelessly communicates with the plurality of wireless terminals, wherein said base station device includes:
a processor configured to set, when a bandwidth of a signal to be transmitted from the base station device to one of the wireless terminals is set from a first bandwidth to a second bandwidth, which is narrower than the first bandwidth, a transmission power per unit bandwidth of the signal transmitted from the base station device to the one wireless terminal from a first transmission power to a second transmission power, which is larger than the first transmission power, and
to set, when the bandwidth is set from the second bandwidth to the first bandwidth, the transmission power from the second transmission power to the first transmission power; and
said one wireless terminal includes a receiver configured to receive a notification of the set bandwidth and uses the set bandwidth to receive a signal transmitted by the set transmission power per unit bandwidth, wherein
when a communication quality of a wireless terminal that has generated a communication request is worse than the communication quality of a wireless terminal having a worst communication quality among the plurality of wireless terminals in communication with the base station device, the processor of the base station device sets the bandwidth to be narrower than a previously defined bandwidth and the transmission power to be higher than a previously defined transmission power; and
when the communication quality of the wireless terminal that has generated the communication request is better than the communication quality of the wireless terminal having the worst communication quality, the processor of the base station device does not change the bandwidth transmission power.

2. The communication system according to claim 1, wherein
the processor of the base station device is configured to:
detect a communication quality of the one wireless terminal, and
set the first bandwidth and the first transmission power when the communication quality is better than a first reference quality and sets the second bandwidth and the second transmission power when the communication quality is worse than a second reference quality.

3. The communication system according to claim 2, wherein
when the plurality of the wireless terminals to be communicating with the base station device are present, the processor of the base station device sets the transmission power as well as the bandwidth corresponding to the wireless terminal with the worst communication quality.

4. The communication system according to claim 1, wherein
the one wireless terminal includes a first communication mode and a second communication mode having a priority lower than the priority of the first communication mode; and
when the wireless terminal that has generated the communication request is in the second communication mode, the processor of the base station device does not change the bandwidth and the transmission power even if the communication quality of the wireless terminal that has generated the communication request is worse than the communication quality of the wireless terminal having the worst communication quality among the wireless terminals in communication.

5. The communication system according to claim 1, wherein
when a communication quality of a wireless terminal that has generated a communication end request is the communication quality of the wireless terminal having the worst communication quality among the wireless terminals in communication with the base station device, the processor of the base station device sets the bandwidth to be wider than the set bandwidth and the transmission power to be lower than the set transmission power; and
when the communication quality of the wireless terminal that has generated the communication request is not the wireless terminal with the worst communication quality, the processor of the base station device does not change the bandwidth and the transmission power.

6. The communication system according to claim 5, wherein
the one wireless terminal includes a first communication mode and a second communication mode having a priority lower than the priority of the first communication mode; and
when at least one of the wireless terminals other than the wireless terminal that has generated the communication end request is in the first communication mode, the processor of the base station device does not change the bandwidth and the transmission power even if the communication quality of the wireless terminal that has generated the communication end request is the communication quality of the wireless terminal having the worst communication quality among the wireless terminals in communication.

7. The communication system according to claim 1, wherein
when there is no wireless terminal in communication with the base station device while the one wireless terminal is present in a zone of the base station device, the processor of the base station device makes the bandwidth a minimum and makes the transmission power a maximum.

8. The communication system according to claim 1, wherein
the one wireless terminal includes a transmitter that transmits a quality of communication with the base station device to the base station device.

9. The communication system according to claim 1, wherein
the processor of the base station device sets the bandwidth and the transmission power so that a product between the bandwidth and the transmission power is constant.

10. The communication system according to claim 1, wherein
the communication system includes a macro base station device and a femto base station device having an area narrower than and overlapped with that of the macro base station device, and
the base station device is the femto base station.

11. A base station device that wirelessly communicates with a plurality of wireless terminals, wherein
said base station device includes:
a processor configured to
set, when the bandwidth of a signal to be transmitted from the base station device to one of the wireless terminals is set from a first bandwidth to a second bandwidth, which is narrower than the first bandwidth, the transmission power per unit bandwidth of the signal transmitted from the base station device to the one wireless terminal from a first transmission power to a second transmission power, which is larger than the first transmission power, and set, when the bandwidth is set from the second bandwidth to the first bandwidth, the transmission power from the second transmission power to the first transmission power; and a transmitter that notifies the one wireless terminal of the set bandwidth and uses the set bandwidth to transmit a signal by the set transmission power per unit, wherein when a communication quality of a wireless terminal that has generated a communication request is worse than the communication quality of a wireless terminal having a worst communication quality among the plurality of wireless terminals in communication with the base station device, the processor of the base station device sets the bandwidth to be narrower than a previously defined bandwidth and the transmission power to be higher than a previously defined transmission power; and when the communication quality of the wireless terminal that has generated the communication request is better than the communication quality of the wireless terminal having the worst communication quality, the processor of the base station device does not change the bandwidth and the transmission power.

12. A method for controlling a communication system having a plurality of wireless terminals and a base station device that wirelessly communicates with the wireless terminals, comprising the steps of:

setting a transmission electric power per unit bandwidth of a signal to be transmitted from the base station device to one of the wireless terminals from a first transmission power to a second transmission power, which is larger than the first transmission power, when a bandwidth of the signal to be transmitted from the base station device to the one wireless terminal is set from a first bandwidth to a second bandwidth, which is narrower than the first bandwidth, and setting the transmission power from the second transmission power to the first transmission power when the bandwidth is set from the second bandwidth to the first bandwidth;

allowing the one wireless terminal to receive a notification of the set bandwidth and use the set bandwidth to receive a signal transmitted by the set transmission power per unit bandwidth;

when a communication quality of a wireless terminal that has generated a communication request is worse than the communication quality of a wireless terminal having a worst communication quality among the plurality of wireless terminals in communication with the base station device, setting the bandwidth to be narrower than a previously defined bandwidth and the transmission power to be higher than a previously defined transmission power; and when the communication quality of the wireless terminal that has generated the communication request is better than the communication quality of the wireless terminal having the worst communication quality, not changing the bandwidth and the transmission power.

* * * * *